(12) United States Patent
Kita

(10) Patent No.: US 10,086,889 B2
(45) Date of Patent: Oct. 2, 2018

(54) ROLLER DEVICE AND ROLLER SHELL FOR TRACK-TYPE WORK VEHICLE

(71) Applicant: KOMATSU LTD., Tokyo (JP)

(72) Inventor: Naoaki Kita, Hirakata (JP)

(73) Assignee: KOMATSU LTD., Tokyo (JP)

( * ) Notice: Subject to any disclaimer, the term of this patent is extended or adjusted under 35 U.S.C. 154(b) by 240 days.

(21) Appl. No.: 14/382,905

(22) PCT Filed: May 28, 2014

(86) PCT No.: PCT/JP2014/064133
§ 371 (c)(1),
(2) Date: Sep. 4, 2014

(87) PCT Pub. No.: WO2015/132978
PCT Pub. Date: Sep. 11, 2015

(65) Prior Publication Data
US 2016/0236735 A1      Aug. 18, 2016

(30) Foreign Application Priority Data

Mar. 5, 2014   (JP) ................. 2014-042749

(51) Int. Cl.
*B62D 55/14* (2006.01)
*B62D 55/092* (2006.01)
(Continued)

(52) U.S. Cl.
CPC .......... *B62D 55/14* (2013.01); *B62D 55/092* (2013.01); *B62D 55/145* (2013.01); *B62D 55/15* (2013.01);
(Continued)

(58) Field of Classification Search
CPC ....... B62D 55/14; B62D 55/15; B62D 55/145
(Continued)

(56) References Cited

U.S. PATENT DOCUMENTS

| | | | |
|---|---|---|---|
| 2,480,908 A * | 9/1949 | Davies .................. | B62D 55/15 277/403 |
| 3,154,958 A * | 11/1964 | Cadwell .............. | B62D 55/145 474/187 |

(Continued)

FOREIGN PATENT DOCUMENTS

| CN | 101229823 A | 7/2008 |
|---|---|---|
| CN | 102421660 A | 4/2012 |

(Continued)

*Primary Examiner* — Kip T Kotter
*Assistant Examiner* — Scott A Browne
(74) *Attorney, Agent, or Firm* — Drinker Biddle & Reath LLP

(57) ABSTRACT

Roller shell has a first cylindrical part and a second cylindrical part. An outer diameter of the first cylindrical part is larger than an outer diameter of the second cylindrical part, and an inner diameter of the first cylindrical part is smaller than an inner diameter of the second cylindrical part. The first cylindrical part fits to a small-diameter bushing part, and the second cylindrical part fits to a large-diameter bushing part. The second cylindrical part has a slit which extends through an outer circumferential surface and an inner circumferential surface and is open at an end surface. The roller shell engages with a step part. An engaging member fits to a groove and engages with the slit. A retainer is formed to have an annular shape and is detachably attached to bushing to hold an end surface of the roller shell.

11 Claims, 15 Drawing Sheets

(51) Int. Cl.
*B62D 55/15* (2006.01)
*B62D 55/088* (2006.01)
*E02F 3/76* (2006.01)
*F16D 1/06* (2006.01)
*F16D 1/076* (2006.01)
*F16D 1/08* (2006.01)

(52) U.S. Cl.
CPC .......... *B62D 55/088* (2013.01); *E02F 3/7609* (2013.01); *F16D 1/06* (2013.01); *F16D 1/076* (2013.01); *F16D 1/0876* (2013.01)

(58) Field of Classification Search
USPC ........................................ 305/136, 137, 138
See application file for complete search history.

(56) References Cited

U.S. PATENT DOCUMENTS

| | | | |
|---|---|---|---|
| 3,586,398 A | 6/1971 | Dadds, et al. | |
| 3,744,860 A | 7/1973 | Casey | |
| 3,869,931 A * | 3/1975 | Boggs | B62D 55/145 305/119 |
| 3,910,128 A * | 10/1975 | Boggs | B62D 55/15 305/100 |
| 4,085,981 A * | 4/1978 | Takenaka | B61F 17/00 384/418 |
| 4,371,362 A * | 2/1983 | Dorris | B60B 25/02 301/13.2 |
| 5,040,855 A * | 8/1991 | Diekevers | B62D 55/0966 305/137 |
| 5,829,848 A * | 11/1998 | Kelderman | B62D 55/04 305/130 |
| 6,280,009 B1 * | 8/2001 | Oertley | B62D 55/0966 305/136 |
| 6,631,961 B1 * | 10/2003 | Bedford | B62D 55/145 305/100 |
| 8,360,677 B2 * | 1/2013 | Yamashita | F16D 1/092 403/359.1 |
| 2004/0084961 A1 * | 5/2004 | Yamamoto | B62D 55/15 305/136 |
| 2005/0212358 A1 | 9/2005 | Yamamoto et al. | |
| 2010/0038902 A1 * | 2/2010 | Sandman | B21D 19/046 285/337 |
| 2012/0056473 A1 * | 3/2012 | Hashimoto | B62D 55/0887 305/136 |
| 2012/0146397 A1 * | 6/2012 | Hisamatsu | B62D 55/14 305/100 |
| 2013/0277917 A1 * | 10/2013 | Orlowski | F16J 15/002 277/346 |
| 2015/0008729 A1 * | 1/2015 | Kita | B62D 55/15 305/136 |
| 2016/0236734 A1 * | 8/2016 | Kita | B62D 55/092 |

FOREIGN PATENT DOCUMENTS

| | | | | |
|---|---|---|---|---|
| CN | 102481959 A | 5/2012 | | |
| EP | 1106847 A2 * | 6/2001 | ............. | F16C 3/03 |
| EP | 1310691 A1 * | 5/2003 | ............. | F16C 3/03 |
| JP | S45-11208 Y1 | 5/1970 | | |
| JP | S50-90026 A | 7/1975 | | |
| JP | S55-168486 U | 12/1980 | | |
| JP | H09-21407 A | 1/1997 | | |
| JP | H09-329112 A | 12/1997 | | |
| JP | 2004-161043 A | 6/2004 | | |
| JP | WO 2015029162 A1 * | 3/2015 | ............ | B60B 11/06 |

* cited by examiner (A)

(B)

ROLLER DEVICE AND ROLLER SHELL FOR TRACK-TYPE WORK VEHICLE

TECHNICAL FIELD

The present invention relates to a roller device and a roller shell for a track-type work vehicle.

BACKGROUND ART

A track-type work vehicle such as a bulldozer has a track-type traveling unit. The track-type traveling unit includes a crawler belt apparatus, a sprocket wheel, an idler tumbler, roller devices, and the like. A crawler belt apparatus is generally configured by coupling a plurality of crawler belt links in an endless manner by means of pins and bushings, and attaching track shoe plates to the plurality of crawler belt links. The crawler belt apparatus is wound around the sprocket wheel, the idler tumbler, and the roller devices, and is configured to be rotationally drivable by engaging a sprocket tooth with a bushing and rotating the sprocket wheel.

The roller device has a shaft, a bushing, a roller shell, and the like. The shaft is fixed to the work vehicle. The roller shell is rotatably supported by the shaft through the bushing. The roller shell is worn by rolling on a rail surface of the crawler belt links during traveling. As the wearing of the roller shell proceeds, it would be necessary to replace the roller shell. For the replacement of the roller shell, a method of replacing a whole roller device may be taken, but such a method requires high cost. Therefore, there has been proposed a method of replacing only a roller shell rather than a whole roller device. The method of replacing only a roller shell rather than a whole roller device is disclosed in, for example, Japanese Patent Laying-Open No. 50-90026 (PTD 1).

CITATION LIST

Patent Document

PTD 1: Japanese Patent Laying-Open No. 50-90026

SUMMARY OF INVENTION

Technical Problem

According to the roller device disclosed in the document described above, a roller shell is press-fitted to an outer circumference of a bushing. Further, the roller shell is fixed to the bushing by means of a bolt through a retainer plate. The bushing is fitted over the shaft in a freely rotatable manner, and a rotating part retains a lubricant. Since the roller shell is fixed to the bushing by means of the bolt through the retainer plate, there is a case where a bending stress is exerted to the bolt by a load applied to the roller shell from the crawler belt link. This bending stress loosens the bolt. Moreover, the fitting pressure of the roller shell decreases due to wearing. There has been a problem that such a matter is likely to cause rotation of the roller shell relative to the bushing to which the roller shell should be fixed.

The present invention was made in view of the problem described above, and its object is to provide a roller device and a roller shell capable of suppressing rotation of the roller shell relative to the bushing while the roller shell being replaceable.

Solution to Problem

A roller device for a track-type work vehicle according to the present invention includes a shaft, a bushing, a roller shell, an engaging member, and a retainer. The shaft includes a rotation axis. The bushing includes a small-diameter part arranged at an end, and a large-diameter part arranged to have a step part with the small-diameter part and having an outer circumferential surface with a recess, and is fitted to an outer circumference of the shaft so as to be rotatable about the rotation axis relative to the shaft. The roller shell includes a first cylindrical part having a first outer circumferential surface and a first inner circumferential surface, and a second cylindrical part having a second outer circumferential surface and a second inner circumferential surface. An outer diameter of the first cylindrical part is larger than an outer diameter of the second cylindrical part, and an inner diameter of the first cylindrical part is smaller than an inner diameter of the second cylindrical part. The first cylindrical part is fitted at the first inner circumferential surface to the small-diameter part of the bushing, and the second cylindrical part is fitted at the second inner circumferential surface to the large-diameter part of the bushing. The second cylindrical part has at the second inner circumferential surface a groove part which is open at an end surface of the second cylindrical part in an extending direction of the rotation axis. The roller shell engages with the step part. The engaging member is fitted to the recess and engages with the groove part. The retainer is formed to be annular and detachably attached to the bushing to hold an end surface of the roller shell.

According to the roller device for a track-type work vehicle of the present invention, the retainer is detachably fixed to the end surface of the bushing. Therefore, the roller shell can be detached from the roller device by detaching the retainer from the bushing, so that the roller shell can be readily replaced.

Moreover, the roller shell engages with the step part of the bushing in a state of being fitted to the bushing, and the retainer holds the end surface of the roller shell. Therefore, the roller shell can be firmly fixed to the bushing by holding the roller shell by means of the retainer toward the step part of the bushing. Accordingly, it would not be necessary to integrally fix the roller shell and the retainer by means of a bolt or the like to fix the roller shell to the bushing. Thus, loosening of the bolt due to a bending stress exerted to the bolt by a load applied to the roller shell can be prevented. Therefore, the rotation of the roller shell relative to the bushing can be suppressed while the roller shell being replaceable.

Further, the engaging member is fitted to the recess formed at the outer circumferential surface of the bushing and engages with the groove part formed at the second cylindrical part of the roller shell. Therefore, when the roller shell is about to rotate relative to the bushing in the circumferential direction, the engaging member engages with both the recess and the groove part. Accordingly, rotation of the roller shell relative to the bushing in the circumferential direction can be further suppressed.

In the roller device described above, the engaging member includes an insertion part inserted into the recess, and a protrusion part protruding from the recess toward an outer circumferential side about the rotation axis. The insertion part has an overhanging part which overhangs from the protrusion part in at least any of the extending direction of the rotation axis and the circumferential direction about the rotation axis. The roller shell is positioned so as to cover the overhanging part at the outer circumferential side about the rotation axis.

The outer circumference of the overhanging part is covered with the roller shell in such a manner, so that the engaging member is prevented from getting out of the recess. Moreover, since the engaging member can be prevented from getting out of the recess as long as the second cylindrical part covers only the outer circumferential side of the overhanging part, the second cylindrical part does not need to cover the outer circumferential side of the protrusion part. Accordingly, a thickness of the second cylindrical part can be made smaller, so that a weight of the roller shell can be reduced.

In the roller device described above, a size of the groove part in the circumferential direction is smaller than a size of the recess in the circumferential direction. Accordingly, the outer circumference of the overhanging part can be covered with the roller shell.

In the roller device described above, the overhanging part has a first overhanging portion overhanging on one side in the circumferential direction with respect to the protrusion part, and a second overhanging portion overhanging on the other side in the circumferential direction with respect to the protrusion part. The roller shell is positioned so as to cover outer circumferential sides of both of the first overhanging portion and the second overhanging portion. Since the roller shell covers the outer circumferential sides of both of the first and second overhanging portions positioned on both sides in the circumferential direction with respect to the protrusion part, the engaging member can be prevented from getting out of the recess more securely.

In the roller device described above, the overhanging part overhangs only on one side in the circumferential direction with respect to the protrusion part. The engaging member can be prevented from getting out of the recess also by the second cylindrical part covering the outer circumferential side of the overhanging part overhanging only on one side of the protrusion part.

In the roller device described above, a male thread part is formed on the outer circumferential surface of the bushing, and a female thread part screwed to the male thread part is formed on the inner circumferential surface of the retainer. The retainer is attached to the bushing by screwing the female thread part to the male thread part. Accordingly, the retainer can be attached to the bushing without a fixing member such as a bolt, so that the number of parts can be reduced.

In the roller device described above, the recess has a circular shape in a view from the outer circumferential side about the rotation axis, and the engaging member is a knock pin. By using a knock pin as an engaging member, the recess can be formed to have a circular shape in a view from the outer circumferential side. Accordingly, the recess can be processed by drilling, so that processing can be readily performed.

In the roller device described above, the groove part of the second cylindrical part is a slit which extends through the second outer circumferential surface and the second inner circumferential surface. Accordingly, it would not be necessary to set a thickness of the second cylindrical part to be larger to an extent of covering the outer circumference of the protrusion part of the engaging member, and the thickness of the second cylindrical part can be set smaller by that amount. In such a manner, as long as the second cylindrical part can be engaged with the protrusion part of the engaging member in the circumferential direction, the thickness thereof can be reduced, so that the weight of the roller shell can be reduced.

A roller shell according to the present invention is a roller shell for a track-type work vehicle. The roller shell is attached to a shaft having a rotation axis through a bushing and can be fixed to the bushing by means of a retainer. This roller shell includes a first cylindrical part having a first outer circumferential surface and a first inner circumferential surface, and a second cylindrical part having a second outer circumferential surface and a second inner circumferential surface. An outer diameter of the first cylindrical part is larger than an outer diameter of the second cylindrical part, and an inner diameter of the first cylindrical part is smaller than an inner diameter of the second cylindrical part. The second cylindrical part has at the second inner circumferential surface a groove part which is open at an end surface of the second cylindrical part in the extending direction of the rotation axis.

According to the roller shell of the present invention, the outer diameter of the first cylindrical part is larger than the outer diameter of the second cylindrical part, and the inner diameter of the first cylindrical part is smaller than the inner diameter of the second cylindrical part. Accordingly, the thickness of the second cylindrical part can be set smaller than the thickness of the first cylindrical part.

Moreover, the groove part is open at the end surface of the second cylindrical part in the rotation axis direction. Therefore, when the roller shell is fitted to the bushing in the rotation axis direction, the engaging member fitted to the recess of the bushing can be inserted into the groove part from the opening part at the end surface of the second cylindrical part. Accordingly, the roller shell can be readily attached.

In the roller shell described above, the groove part of the second cylindrical part is a slit which extends through the second outer circumferential surface and the second inner circumferential surface. Accordingly, it would not be necessary to set a thickness of the second cylindrical part to be larger to an extent of covering the outer circumference of the protrusion part of the engaging member, and the thickness of the second cylindrical part can be set smaller by that amount. Accordingly, as long as the second cylindrical part can be engaged with the protrusion part of the engaging member in the circumferential direction, the thickness thereof can be reduced, so that the weight of the roller shell can be reduced.

Advantageous Effects of Invention

As described above, according to the present invention, rotation of the roller shell relative to the bushing can be suppressed while the roller shell being replaceable.

DESCRIPTION OF EMBODIMENTS

In the following, embodiments of the present invention will be described with reference to the drawings.

First Embodiment

Firstly, a configuration of a bulldozer according to the first embodiment of the present invention will be described with reference to FIG. 1. In the following, the bulldozer will be described which is one example of a track-type work vehicle to which the idea of the present invention is applicable. However, the present invention is also applicable to a track-type work vehicle such as a hydraulic excavator.

Figure 1:
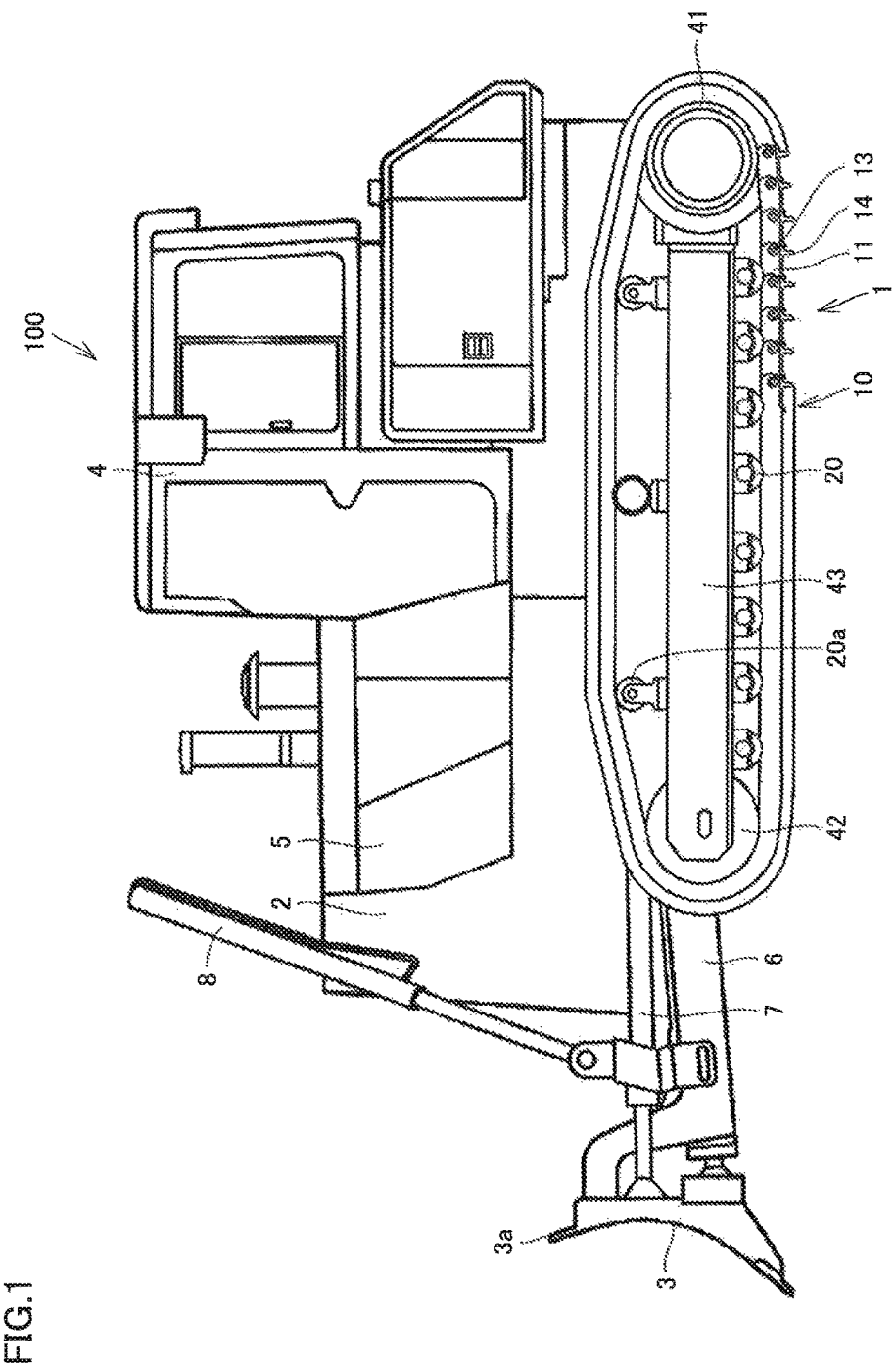
FIG. 1 is a schematic side view representing a configuration of a bulldozer as an example of a track-type work vehicle according to a first embodiment of the present invention.

FIG. 1 is a schematic side view representing a configuration of the bulldozer as an example of a track-type work vehicle according to the first embodiment of the present invention. Referring to FIG. 1, a bulldozer 100 of the present embodiment mainly includes a pair of left and right traveling apparatuses provided with a track-type traveling unit 1 and separated apart in a width direction, a vehicular body 2 arranged between the pair of left and right traveling apparatuses, and a blade 3 arranged at a front position of vehicular body 2.

Vehicular body 2 has a cab (operator's cab) 4 and an engine compartment 5. Cab 4 occupies an upper rear part of vehicular body 2, and engine compartment 5 is arranged in front of cab 4.

Blade 3 is supported by frames 6 on both left and right sides, and is provides so as to be operated by angle cylinders 7 and lift cylinders 8. An upper end 3a of blade 3 represents an upper part of a left end or a right end of blade 3. One end of frame 6 is attached to a back surface of blade 3 by means of a support part which is freely rotatable, and the other end of frame 6 is pivotally supported on a side surface of vehicular body 2. One end of angle cylinder 7 is pivotally supported on the back surface of blade 3, and the other end of angle cylinder 7 is pivotally supported on the side surface of vehicular body 2. Expansion and contraction of this angle cylinder 7 by means of a hydraulic pressure moves upper end 3a in forward and backward directions (leftward and rightward directions in FIG. 1) about a support part of frame 6 at blade 3, so that an angling control of a posture of blade 3 in forward and backward directions can be performed. One end of lift cylinder 8 is pivotally supported on an upper surface of frame 6, and a middle part of lift cylinder 8 is pivotally supported on a side surface of vehicular body 2. Expansion and contraction of this lift cylinder 8 by means of a hydraulic pressure moves blade 3 in upward and downward directions about the other end of frame 6.

Track-type traveling unit 1 mainly includes a crawler belt apparatus 10, roller devices (track rollers) 20, carrier rollers 20a, drive wheels (sprocket wheels) 41, idler wheels (idler tumblers) 42, and track frames 43.

Drive wheel 41 and track frame 43 are disposed on each of both sides of vehicular body 2. Idler wheel 42, a plurality of lower roller devices (track rollers) 20, and a plurality of upper roller devices (carrier rollers) 20a are attached to each of track frames 43 provided on both sides. Drive wheels 41 are provided on a rear side of track frames 43 in a rotationally drivable manner, and idler wheels 42 are provided rotatably at front ends of track frames 43. The plurality of roller devices (track rollers) 20 are provided rotatably on a lower surface side of track frames 43, and the plurality of carrier rollers 20a are provided rotatably on an upper surface side of track frames 43.

Crawler belt apparatus 10 is configured in an endless manner (annular) and wound around drive wheel 41 and idler wheel 42. Moreover, crawler belt apparatus 10 is supported by a plurality of roller devices (track rollers) 20 and a plurality of carrier rollers 20a arranged between drive wheel 41 and idler wheel 42.

Crawler belt apparatus 10 is in mesh with drive wheel 41 and is configured to be rotationally drivable by rotational driving of this drive wheel 41. During the rotational driving of this crawler belt apparatus 10, each of idler wheel 42, the plurality of roller devices (track rollers) 20, and the plurality of carrier rollers 20a can be rotationally driven in contact with crawler belt apparatus 10.

Next, a configuration of crawler belt apparatus 10 used in the bulldozer will be described with reference to FIG. 2.

Figure 2:
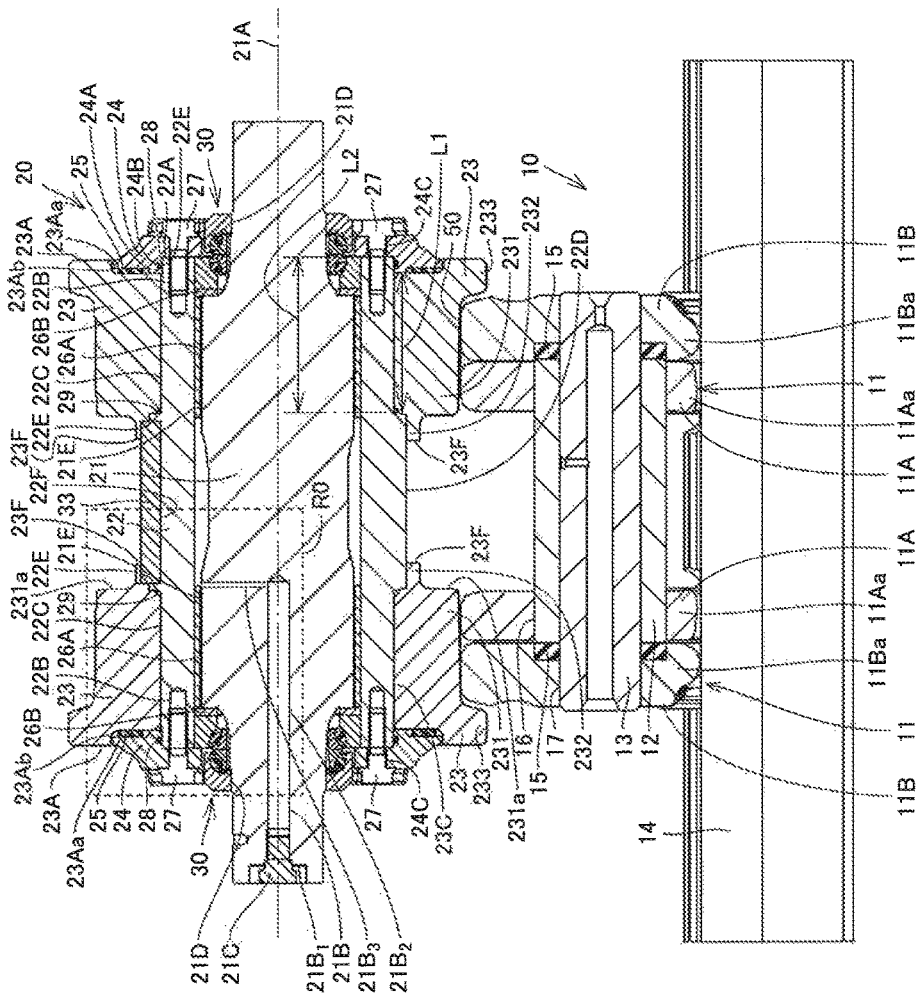
FIG. 2 is a cross-sectional view schematically representing a circumstance in which a roller device is in contact with a crawler belt apparatus included in a track-type traveling unit of the track-type work vehicle of FIG. 1.

FIG. 2 is a cross-sectional view schematically representing a circumstance in which the roller device is in contact with the crawler belt apparatus included in the track-type traveling unit of FIG. 1. Referring to FIG. 2, crawler belt apparatus 10 described above mainly has crawler belt links 11, a bushing 12, a coupling pin 13, a track shoe plate (shoe plate) 14, and a sealing member 15. Crawler belt apparatus 10 is configured to be annular by coupling in an endless manner a plurality of crawler belt links 11 to which track shoe plates 14 are attached as shown in FIG. 1.

Referring to FIG. 2, in one crawler belt apparatus 10, a plurality of crawler belt links 11 are arranged in two rows. One and the other crawler belt links 11A, 11B adjacent to each other in the same row are arranged so that a bushing hole 16 of one crawler belt link 11A and a pin hole 17 of the other crawler belt link 11B are in communication with each other.

Cylindrical bushing 12 is press-fitted in bushing hole 16 of one crawler belt link 11A. Coupling pin 13 is inserted into bushing 12 and press-fitted in pin hole 17 of the other crawler belt link 11B. Moreover, sealing member 15 is inserted into a large-diameter part of pin hole 17 of the other crawler belt link 11B. In such a manner, one and the other crawler belt links 11A, 11B lined in the row direction are coupled to each other.

Moreover, a first-row crawler belt link 11 is provided as described above on one end side of one bushing 12 and coupling pin 13, and a second-row crawler belt link 11 is provided on the other end side, so that crawler belt links 11 on one row and on the other row are coupled with each other. In this state, one end 11Aa of one crawler belt link 11A of each of the first row and second row are arranged inside of two rows of crawler belt links 11, and the other ends 11Ba of the other crawler belt links 11B are arranged outside of two rows of crawler belt links 11.

Next, a configuration of roller device (track roller) 20, which is included in crawler belt apparatus 10 described above and has roller shell 23 which can roll in contact with rail surface 50 of crawler belt link 11, will be described in detail with reference to FIGS. 2 to 6.

Figure 3:
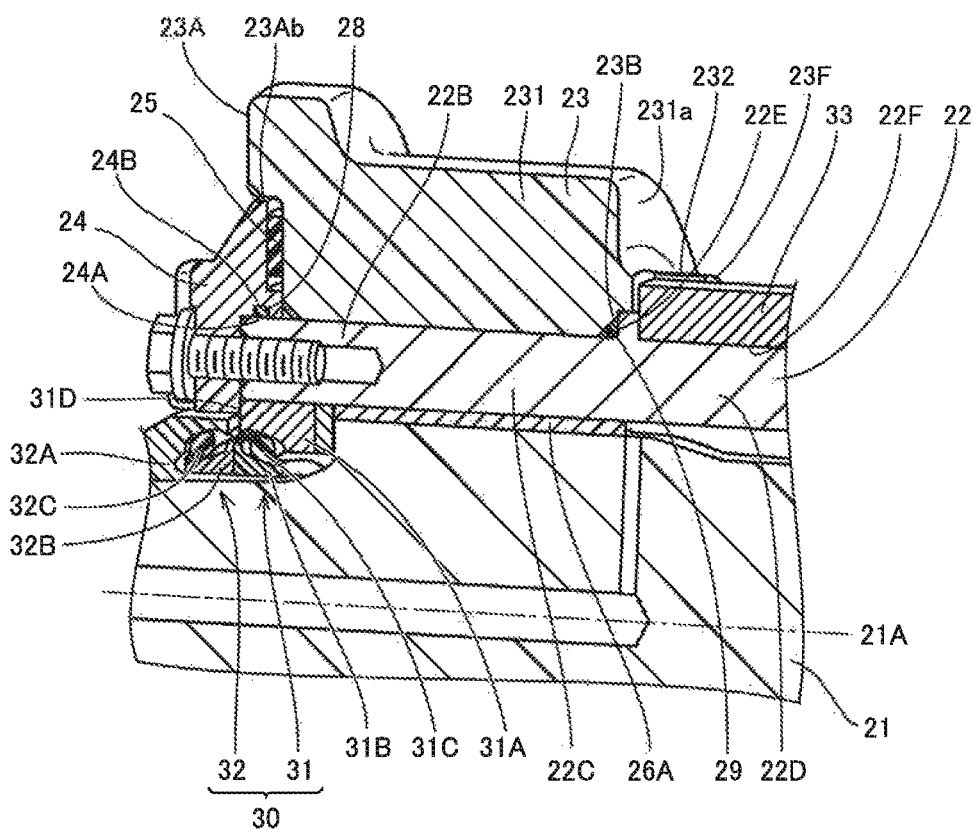
FIG. 3 is a partially enlarged perspective cross-sectional view representing an enlargement of a region R0 of FIG. 2.
Figure 4:
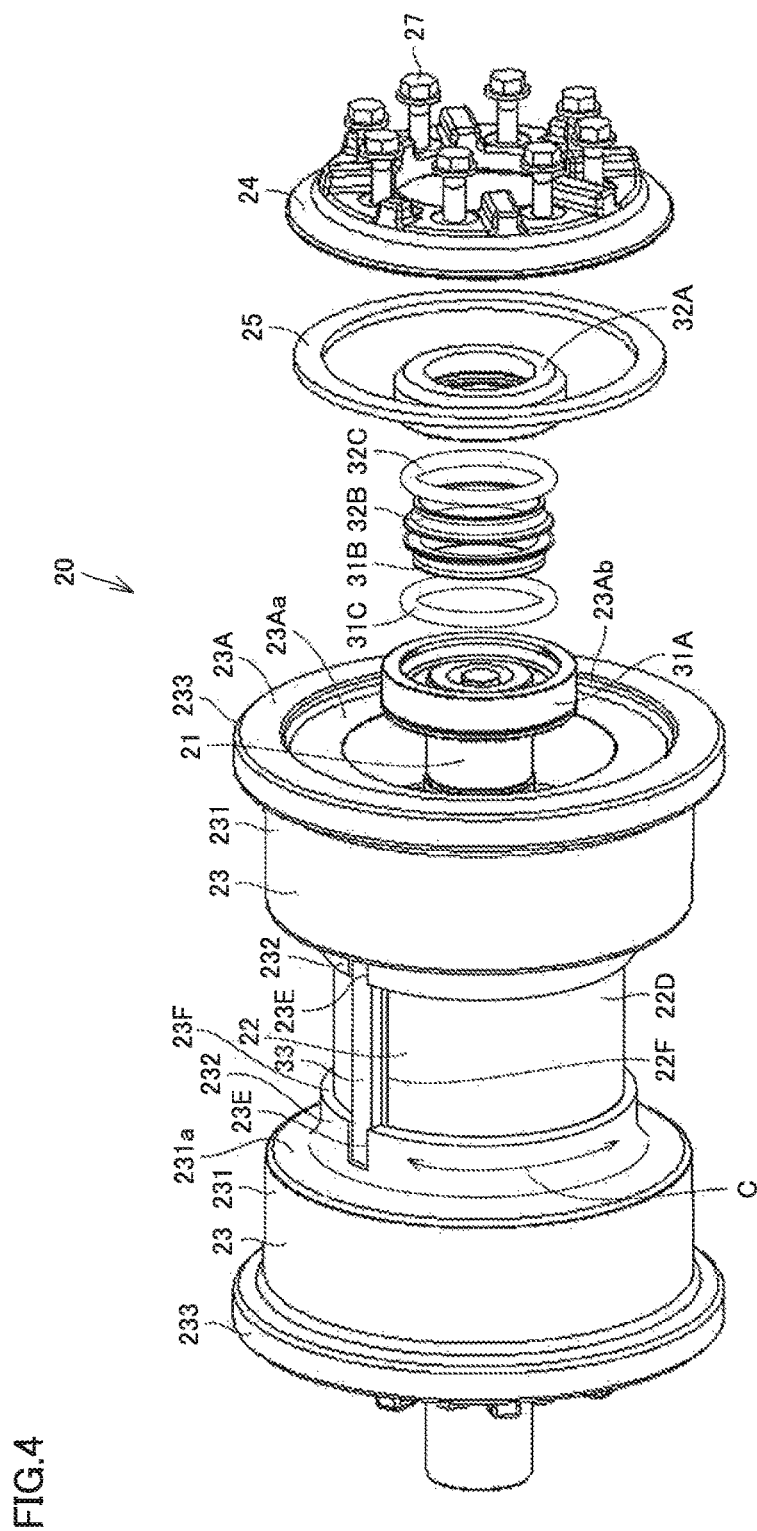
FIG. 4 is a partially exploded perspective view schematically representing a configuration of the roller device of FIG. 2.
Figure 5:
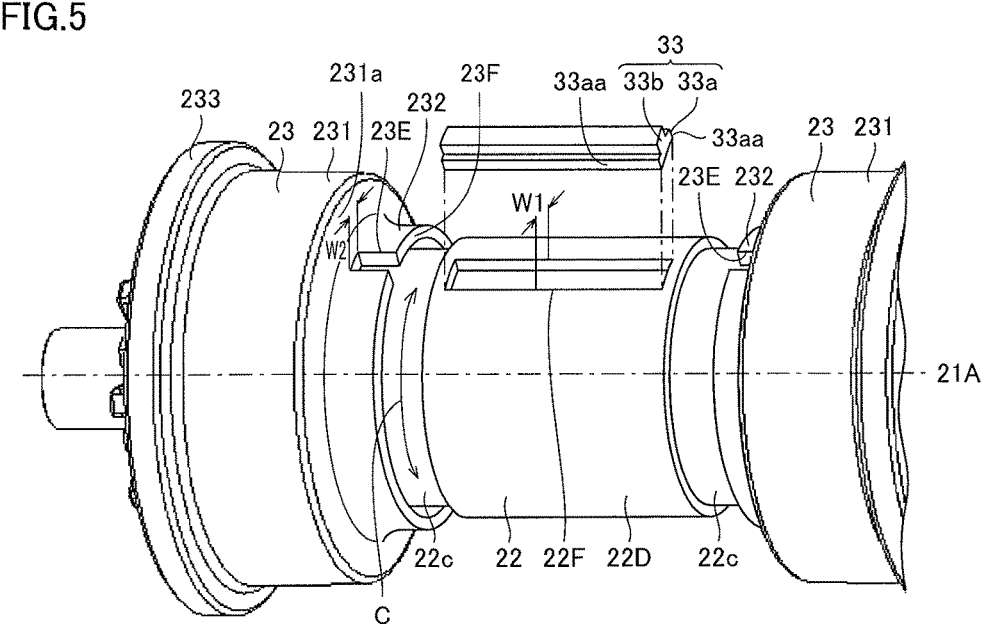
FIG. 5 is a partially exploded perspective view representing in an exploded manner a bushing, roller shells, and a key in the roller device of FIG. 2.
Figure 6:
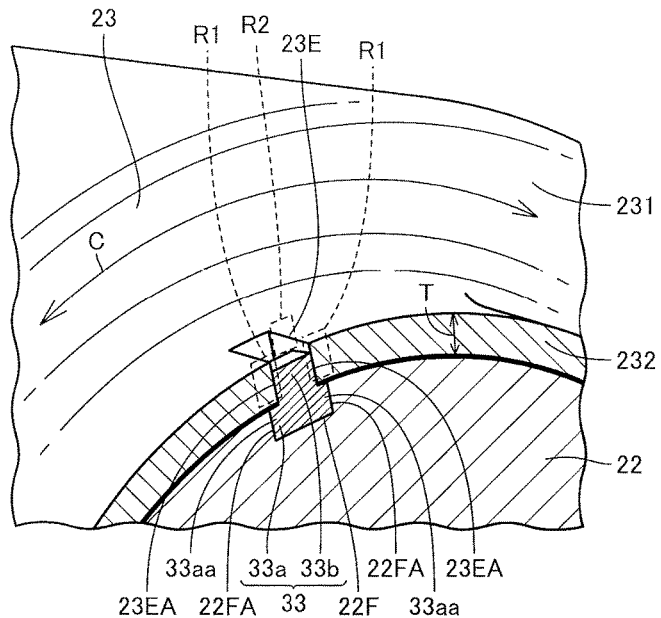
FIG. 6 is a partial perspective cross-sectional view representing a circumstance in which the key engages with a hole part and a slit (groove part) in the roller device of FIG. 2.

FIG. 3 is a partially enlarged perspective cross-sectional view representing an enlargement of a region R0 of FIG. 2. FIG. 4 is a partially exploded perspective view schematically representing a configuration of the roller device of FIG. 2. FIG. 5 is a partially exploded perspective view representing in an exploded manner the bushing, the roller shells, and a key in the roller device of FIG. 2. FIG. 6 is a partial perspective cross-sectional view representing a circumstance in which the key engages with a hole part and a slit (groove part) in the roller device of FIG. 2.

Mainly referring to FIG. 2, roller device (track roller) 20 mainly has a shaft 21, a bushing 22, roller shells 23, retainers 24, elastic members 25, bearings 26A, thrust bearings 26B, fixing members (bolt) 27, O-rings 28, 29, seals 30, and an engaging member 33.

Shaft 21 has a columnar shape, and has a rotation axis 21A. This rotation axis 21A is an imaginary axis line which passes through a center of shaft 21. Shaft 21 has small-diameter shaft parts 21D arranged on each of both ends, and large-diameter shaft parts 21E arranged more on the center side than small-diameter shaft parts 21D. Between large-diameter shaft part 21E and small-diameter shaft part 21D, an annular flat outer circumferential surface is provided which is located in the flat surface orthogonal to rotation axis 21A. Large-diameter shaft part 21E has a columnar shape at both ends in the axial direction, and a part having a smaller diameter than the columnar part is provided between the columnar parts.

Bushing 22 is fitted to the outer circumference of shaft 21 so as to be rotatable relative to shaft 21 about rotation axis 21A. Bushing 22 has a small-diameter bushing part 22C arranged at each of both ends and a large-diameter bushing part 22D arranged more on a central side than small-diameter bushing part 22C. Step parts 22E are arranged at an outer circumferential surface of bushing 22 between large-diameter bushing part 22D and each of small-diameter bushing parts 22C at both ends.

Step parts 22E are portions connecting large-diameter bushing part 22D and small-diameter bushing parts 22C having different sizes in the radial direction about rotation axis 21A, and constituting steps providing a difference in the sizes between large-diameter bushing part 22D and small-diameter bushing parts 22C in the radial direction. An inner circumferential ends of step parts 22E are connected to small-diameter bushing parts 22C, and outer circumferential ends of step parts 22E are connected to large-diameter bushing part 22D.

Step part 22E has a surface crossing the extending direction of rotation axis 21A (in the following, referred to as "rotation axis direction"), and has an annular flat surface which is, for example, orthogonal to rotation axis 21A. Moreover, it is not always necessary that the surface of step part 22E is orthogonal to rotation axis 21A, and it may be a surface tilted with respect to an imaginary plane orthogonal to rotation axis 21A (for example, side circumferential surface having a shape of a circular truncated cone). In this case, step part 22E has a tapered shape which is gradually reduced in the size in the radial direction about rotation axis 21A from an outer circumferential end as a connection part with large-diameter bushing part 22D to an inner circumferential end as a connection part with small-diameter bushing part 22C. Step part 22E is a portion which supports roller shell 23 in the direction of rotation axis 21A.

Bearings 26A are arranged between the outer circumference of shaft 21 and an inner circumference of bushing 22. Shaft 21 is configured such that lubricating oil can be supplied to this bearing 26A.

Specifically, a supply passage 21B for supplying the lubricating oil to bearing 26A between shaft 21 and bushing 22 is formed in shaft 21. This supply passage 21B has an opening part $21B_1$, an axial direction extending part $21B_2$, and a radial direction extending part $21B_3$. Opening part $21B_1$ is formed on one end surface of shaft 21. Axial direction extending part $21B_2$ is formed to extend into shaft 21 from opening part $21B_1$ along the rotation axis direction. Radial direction extending part $21B_3$ is formed to reach the outer circumferential surface of shaft 21 from axial direction extending part $21B_2$. Accordingly, the lubricating oil injected to opening part $21B_1$ can be supplied to a gap between the outer circumference of shaft 21 and the inner circumference of bushing 22 through axial direction extending part $21B_2$ and radial direction extending part $21B_3$.

Moreover, shaft 21 has a plug member 21C which can be mounted to opening part $21B_1$ of supply passage 21B. After the lubricating oil is injected from opening part $21B_1$ to supply passage 21B, plug member 21C is mounted to opening part $21B_1$, so that a leakage of the lubricating oil from opening part $21B_1$ is prevented.

Roller shell 23 has a cylindrical shape having a through hole 23C extending from one end surface 23F to the other end surface 23A. Roller shell 23 is fitted to the outer circumference of bushing 22. Specifically, two roller shells 23 are fitted over two small-diameter bushing part 22C respectively with a gap, in other words, loosely fitted. Accordingly, roller shell 23 is attached to the outer circumferential surface of bushing 22 to be attachable/detachable and replaceable without any special tool.

Roller shell 23 has a first cylindrical part 231 and a second cylindrical part 232. An outer diameter of first cylindrical part 231 is larger than an outer diameter of second cylindrical part 232. Therefore, an outer circumferential surface (first outer circumferential surface) of first cylindrical part 231 is positioned more on an outer circumferential side about rotation axis 21A than an outer circumferential surface (second outer circumferential surface) of second cylindrical part 232. Moreover, an annular flange part 233 is formed on an outer circumferential surface on a side of the other end surface 23a of first cylindrical part 231, and flange part 233 protrudes toward an outer circumferential side about rotation axis 21A more than the outer circumferential surface of the first cylindrical part.

An inner diameter of first cylindrical part 231 is smaller than an inner diameter of second cylindrical part 232. Therefore, an inner circumferential surface (first inner circumferential surface) of first cylindrical part 231 is positioned more on an inner circumferential side about rotation axis 21A than an inner circumferential surface (second inner circumferential surface) of second cylindrical part 232. First cylindrical part 231 fits at its inner circumferential surface to small-diameter bushing part 22C of bushing 22, and second cylindrical part 232 fits at its inner circumferential surface to large-diameter bushing part 22D of bushing 22.

Referring mainly to FIG. 3, a step part 23B is formed between an inner circumferential surface of first cylindrical part 231 and an inner circumferential surface of second cylindrical part 232. This step part 23B is a portion which connects the inner circumferential surface of first cylindrical part 231 and the inner circumferential surface of second cylindrical part 232 which are different from each other in the sizes in the radial direction about rotation axis 21A, and is a portion constituting a step exhibiting a difference in the size in the radial direction between the inner circumferential surface of first cylindrical part 231 and the inner circumferential surface of second cylindrical part 232. The inner circumferential end of this step part 23B is connected to the inner circumferential surface of first cylindrical part 231, and an outer circumferential end of step part 23B is connected to the inner circumferential surface of second cylindrical part 232.

This step part 23B has a tapered part which is reduced in size in the radial direction about rotation axis 21A from the side of inner circumferential surface of second cylindrical part 232 toward the side of inner circumferential surface of first cylindrical part 231. Step part 23B as a whole may be a tapered part, or a part of step part 23B may be a tapered part. The tapered part of step part 23B is a ring-shaped surface formed with an angle of 45° to end surface 231a of the first cylindrical part. An O-ring 29 which will be described later is provided in contact with a tapered part of step part 23B, step part 22E of bushing 22, and the outer circumferential surface of small-diameter bushing part 22C.

Referring mainly to FIG. 2, an axial length L1 of an inner circumference of first cylindrical part 231 of roller shell 23 is shorter than an axial length L2 of small-diameter bushing part 22C. Therefore, the outer circumferential surface of bushing 22 is positioned on an inner circumferential side of a bottom surface 23Aa. In a state where roller shell 23 is attached to bushing 22, step part 23B of the inner circumferential surface of roller shell 23 engages with step part 22E of the outer circumferential surface of bushing 22 through O-ring 29.

Roller shell 23 has a bottom surface 23Aa at a position recessed from the other end surface 23A to a side of one end surface 23F. Bottom surface 23Aa is a flat annular surface orthogonal to rotation axis 21A. A diameter of an outer circumference of bottom surface 23Aa is smaller than an outer diameter of the other end surface 23A of roller shell 23 (outer diameter of flange part 233). Moreover, a diameter of an inner circumference of bottom surface 23Aa is equal to an inner diameter of first cylindrical part 231.

Referring mainly to FIGS. 2 and 4, retainer 24 is fixed to bushing 22 to prevent roller shell 23 from getting out of bushing 22 and hold roller shell 23 in the rotation axis direction toward bushing 22. Retainer 24 has an annular shape. An inner diameter of the annular shape of retainer 24 is larger than an outer diameter of small-diameter shaft part 21D of shaft 21. Therefore, retainer 24 can be fitted to small-diameter shaft part 21D so as to have a gap with the outer circumferential surface of small-diameter shaft part 21D.

Retainer 24 is configured to face a whole end surface 22A of bushing 22 and bottom surface 23Aa of roller shell 23 in a state where retainer 24 is fitted to small-diameter shaft part 21D. Specifically, the outer diameter of the annular shape of retainer 24 has a size which is larger than the outer diameter of end surface 22A of bushing 22 and smaller than or equal to the outer diameter of bottom surface 23Aa of roller shell 23. On end surface 22A of bushing 22, a plurality of attachment holes 22B are formed along the circumferential direction. A portion of retainer 24 facing this attachment hole 22B is formed with a plurality of insertion holes 24C for insertion of bolts along the circumferential direction.

Retainer 24 is fixed to bushing 22 by screwing fixing members 27 (for example, bolts) into attachment holes 22B through insertion holes 24C. Moreover, the outer circumferential surface of the annular shape of retainer 24 is preferably in contact with an outer circumferential wall surface 23Ab formed between bottom surface 23Aa and the other end surface 23A of roller shell 23.

Elastic member 25 is fitted between retainer 24 and bottom surface 23Aa of roller shell 23 in the state where retainer 24 is fixed to bushing 22. Since elastic member 25 is arranged in contact with bottom surface 23Aa, an outer diameter of the annular shape of elastic member 25 has a size which is smaller than or equal to the outer diameter of bottom surface 23Aa of roller shell 23.

In the state where retainer 24 is fixed to bushing 22 by means of fixing members 27, elastic member 25 is elastically deformed and comes into contact with both of roller shell 23 and retainer 24. Accordingly, elastic member 25 holds roller shell 23 in the rotation axis direction toward step part 22E of bushing 22. Accordingly, roller shell 23 is fixed to bushing 22. Since bottom surface 23Aa is a flat surface orthogonal to the rotation axis direction, a force of retainer 24 to hold roller shell 23 is exerted effectively.

In the state where elastic member 25 is elastically deformed, a thickness of elastic member 25 has a size smaller than a depth from the other end surface 23A of roller shell 23 to bottom surface 23Aa. Accordingly, an outer circumferential edge of the annular shape of retainer 24 can come into contact with outer circumferential wall surface 23Ab of roller shell 23.

Elastic member 25 is made of material which is easier to elastically deform than roller shell 23 and retainer 24. Elastic member 25 has a higher friction coefficient than roller shell 23 and retainer 24. Elastic member 25 is formed of, for example, rubber. The rubber which can be used includes NR (natural rubber), CR (chloroprene rubber), NBR (acrylonitrile-butadiene rubber), EPT (ethylene propylene rubber), IIR (isobutylene isoprene rubber), CSM (chlorosulfonated polyethylene rubber), SBR (styrene-butadiene rubber), BR (butadiene rubber), SR (silicone rubber), FR (fluororubber), UR (urethane rubber), and the like.

Elastic member 25 is arranged on bottom surface 23Aa and is provided over an entire circumference in the circumferential direction of the outer circumferential surface of bushing 22. Elastic member 25 is formed to be annular. Moreover, elastic member 25 has an even thickness over an entire circumference of the annular shape. Moreover, retainer 24 is formed to be annular so as to cover elastic member 25.

Bearing 26A is fitted over the outer circumferential surface of shaft 21. Specifically, bearing 26A is arranged between the outer circumferential surface of large-diameter shaft part 21E and the inner circumferential surface of bushing 22. Thrust bearing 26B is arranged on an end surface between small-diameter shaft part 21D and large-diameter shaft part 21E.

Retainer 24 is fixed to bushing 22 by means of a plurality of fixing members (bolts) 27 as described above, so that retainer 24 can hold roller shell 23 in the rotation axis direction through elastic member 25. Accordingly, step part (tapered part) 23B of roller shell 23 can engage with step part 22E of bushing 22 through O-ring 29.

Referring mainly to FIGS. 2 and 3, an O-ring 28 is arranged between the outer circumferential surface of bushing 22 and inner circumferential surface 24A of retainer 24. O-ring 28 is arranged within groove part 24B formed on inner circumferential surface 24A of retainer 24. Moreover, as described above, O-ring 29 is arranged between step part 22E and the step part (tapered part). Such arrangement of O-rings 28, 29 prevents entering of earth and sand to the fitting surface between bushing 22 and roller shell 23, so that roller shell 23 can be detached from bushing 22 even after a long-time use of roller device 20.

A seal 30 is arranged on an inner circumferential side of bushing 22 and retainer 24. Seal 30 is a floating seal. Seal 30 has a first sealing member 31 on a rotating side and a second sealing member 32 on a fixing side. First sealing member 31 is configured to be rotatable relative to second sealing member 32.

First sealing member 31 has a first housing 31A, a first floating seal 31B, and a first elastic ring 31C. First housing 31A is an annular member and is press-fitted at its outer circumference to an inner circumference of bushing 22 and then fixed. First floating seal 31B is supported at an inner circumference of first housing 31A through first elastic ring 31C. Moreover, retainer 24 is in contact with an end surface 31D of first sealing member 31.

Second sealing member 32 has a second housing 32A, a second floating seal 32B, and a second elastic ring 32C. Second housing 32A is an annular member and is press-fitted at its inner circumference to shaft 21 and then fixed. Second floating seal 32B is supported at an inner circumference of second housing 32A through second elastic ring 32C.

Elasticity of first elastic ring 31C and second elastic ring 32C causes first floating seal 31B and second floating seal 32B to be in contact with each other so as to maintain a sealed state. When first housing 31A on the rotating side is rotated, first floating seal 31B and second floating seal 32B slide with each other while maintaining the sealed state. Accordingly, a leakage of the lubricating oil can be prevented.

Referring mainly to FIG. 5, engaging member 33 is, for example, a key, and includes an insertion part 33a and a protrusion part 33b. Insertion part 33a has an overhanging portion (overhanging part) 33aa overhanging from protrusion part 33b in a circumferential direction C about rotation axis 21A. In engaging member 33 of the present embodiment, a size of insertion part 33a in circumferential direction C is larger than a size of protrusion part 33b in circumferential direction C. Therefore, engaging member 33 has a first overhanging portion 33aa overhanging relative to protrusion part 33b on one side in circumferential direction C, and a second overhanging portion 33aa overhanging relative to protrusion part 33b on the other side in circumferential direction C. First and second overhanging portions 33aa extend together with insertion part 33a and protrusion part 33b entirely in the rotation axis direction of engaging member 33.

Referring to FIGS. 4 and 5, insertion part 33a of engaging member 33 is fitted within a hole part (recess) 22F provided in the outer circumferential surface of large-diameter bushing part 22D. Hole part 22F extends linearly along the rotation axis direction on the outer circumferential surface of large-diameter bushing part 22D. Moreover, hole part 22F maintains a certain depth in the rotation axis direction.

Both ends of protrusion part 33b of engaging member 33 in the rotation axis direction are fitted within groove parts 23E provided in cylindrical parts 232 of roller shells 23. Accordingly, protrusion part 33b of engaging member 33 engages as a key with groove part 23E described above. Groove part 23E is a slit extending through the outer circumferential surface and inner circumferential surface of second cylindrical part 232. Moreover, groove part 23E reaches one end surface (the end surface of second cylindrical part 232 in the rotation axis direction) 23F to be open. A size W2 of groove part 23E in circumferential direction C is smaller than a size W1 of hole part 22F in circumferential direction C.

Figure 18:
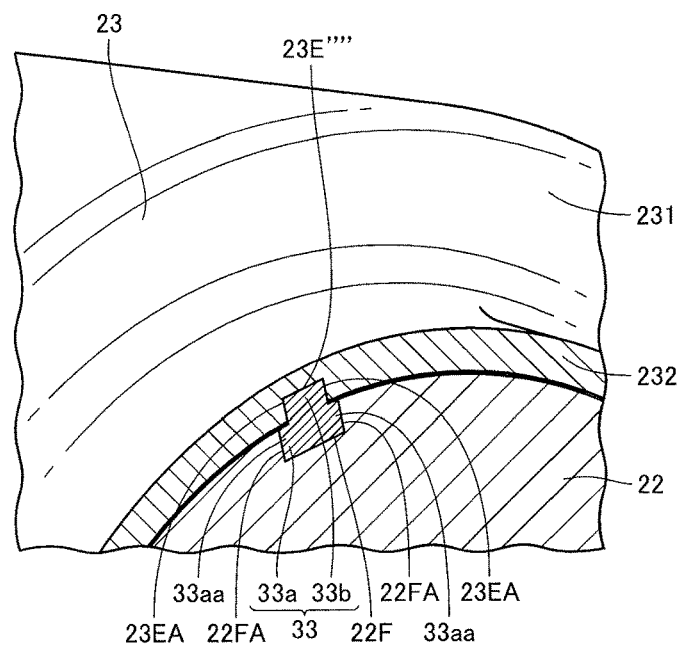
FIG. 18 represents a partial perspective cross-sectional view (A) corresponding to FIG. 6 representing the configuration in the case where the groove part of the first embodiment of the present invention is a groove open only at the inner circumferential surface, and a perspective view (B) schematically representing a configuration of the roller shell having the groove.
Figure 18:
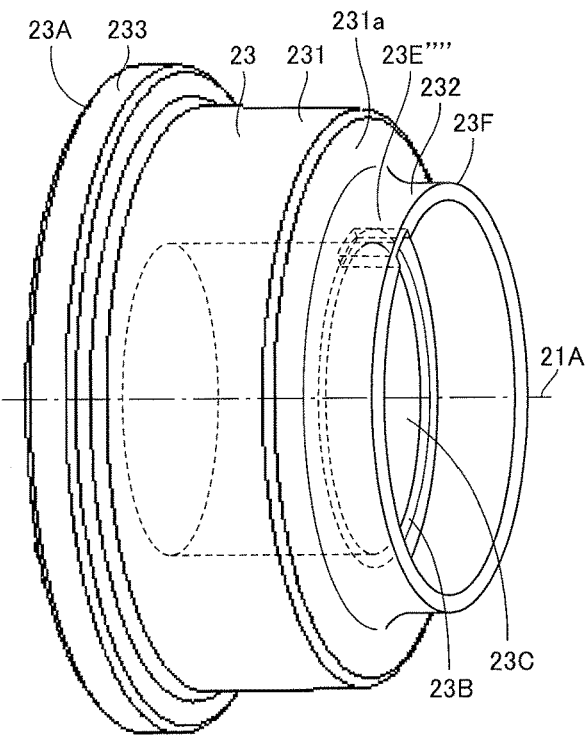

Groove part 23E of the present embodiment is a slit which extends through the outer circumferential surface and inner circumferential surface of the cylindrical part. However, it may be a groove 23E'''' which is open only at the inner circumferential surface as shown in FIG. 18(A). This groove part 23E'''' is formed in the inner circumferential surface of second cylindrical part 232 having a predetermined length in rotation axis direction 21A as shown in FIG. 18(B).

Referring to FIG. 6, in the state where engaging member 33 fits to hole part 22F and engages with groove part 23E, second cylindrical part 232 is positioned so as to cover a region R1 on an outer circumferential side of both of first overhanging portion (for example, overhanging portion on the right side in the drawing) 33aa and second overhanging portion (for example, overhanging portion on the left side in the drawing) 33aa.

Moreover, in this state, the wall surface of overhanging portion 33aa crossing (for example, being orthogonal to) circumferential direction C faces wall surface 22FA of hole part 22F in circumferential direction C. Moreover, the wall surface of protrusion part 33b crossing (for example, being orthogonal to) circumferential direction C faces wall surface 23EA of groove part 23E in circumferential direction C.

Accordingly, engaging member 33 is configured to be engageable with both bushing 22 and roller shell 23 when roller shell 23 is about to rotate relative to bushing 22 in circumferential direction C. Engaging member 33 engages with both bushing 22 and roller shell 23, so that rotation of roller shell 23 relative to bushing 22 in circumferential direction C is prevented.

Referring mainly to FIG. 4, in roller device 20 of the present embodiment, roller shell 23 is merely fitted freely to bushing 22. Therefore, after detaching retainer 24 from bushing 22 by releasing the screwing of a plurality of fixing members (bolts) 27, roller shell 23 can be detached from bushing 22 by drawing roller shell 23 from bushing 22.

Moreover, roller shell 23 is attached to bushing 22 by, inversely to the operation described above, fitting roller shell 23 to bushing 22 in the rotation axis direction and thereafter attaching retainer 24 to end surface 22A of bushing 22 by means of a plurality of fixing members (bolts) 27. When roller shell 23 is fitted to bushing 22 in the rotation axis direction, protrusion part 33b of engaging member 33 is inserted into groove part 23E from the opening part of one end surface 23F of roller shell 23.

In the description above, the case where elastic member 25 is formed continuously over an entire circumference in the circumferential direction of bushing 22 is described. However, not limited to this, elastic member 25 may have a configuration in which a plurality of elastic segments are arranged intermittently along the circumferential direction.

Next, a configuration of roller shell 23 used for roller device 20 described above will be described with reference to FIG. 7.

Figure 7:
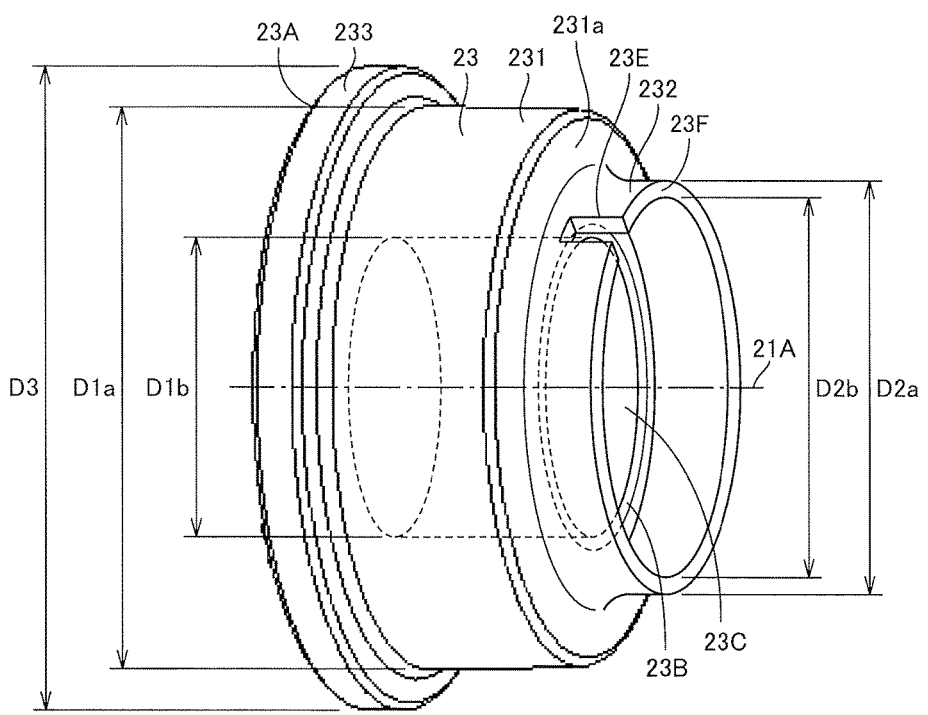
FIG. 7 is a perspective view schematically representing a configuration of the roller shell included in the roller device of FIG. 2.

FIG. 7 is a perspective view schematically representing a configuration of the roller shell included in the roller device of FIG. 2. Referring to FIG. 7, roller shell 23 is a roller shell which is attached through bushing 22 to shaft 21 having rotation axis 21A and can be fixed to bushing 22 by means of retainer 24 as described above. This roller shell 23 has first cylindrical part 231 and second cylindrical part 232. An outer diameter D1a of first cylindrical part 231 is larger than an outer diameter D2a of second cylindrical part 232. An inner diameter D1b of first cylindrical part 231 is smaller than an inner diameter D2b of second cylindrical part 232. Second cylindrical part 232 has a groove part 23E. This groove part 23E extends through the outer circumferential surface and the inner circumferential surface of second cylindrical part 232 and is open at end surface 23F of second cylindrical part 232 in the rotation axis direction.

Moreover, the tapered part of step part 23B is formed at an inner circumferential end of end surface 231a of first cylindrical part 231 on a side of second cylindrical part 232. In the tapered part of this step part 23B, a size in the radial direction about rotation axis 21A is gradually reduced from a side of the end surface 231a toward a side of the other end surface 23A of roller shell 23.

First cylindrical part 231 has an annular flange part 233 in an outer circumferential surface on a side of other end surface 23A. This flange part 233 protrudes toward an outer circumferential side about rotation axis 21A more than the outer circumferential surface of first cylindrical part 231. Accordingly, an outer diameter D3 of flange part 233 is larger than outer diameter D1a of first cylindrical part 231.

Next, the effect of the present embodiment will be described with reference to FIGS. 2 to 7.

According to the present embodiment, as shown in FIG. 2, roller shell 23 is loosely fitted to bushing 22. Further, as shown in FIG. 4, retainer 24 is detachably fixed to the end surface of bushing 22. Therefore, roller shell 23 can be detached from roller device 20 by detaching retainer 24 from bushing 22, so that roller shell 23 can be readily replaced.

Moreover, as shown in FIGS. 2 and 3, roller shell 23 is fitted to bushing 22 and engages with step part 22E of bushing 22, and retainer 24 holds the end surface of roller shell 23. Accordingly, roller shell 23 can be firmly fixed to bushing 22 by holding roller shell 23 toward step part 22E of bushing 22 by means of retainer 24. Accordingly, it would not be necessary to integrally fix roller shell 23 and retainer 24 by means of fixing member 27 such as a bolt to fix roller shell 23 to bushing 22. Thus, loosening of bolt 27 due a bending stress exerted to bolt 27 by a load applied to roller shell 23 can be prevented. Therefore, rotation of roller shell 23 relative to bushing 22 can be suppressed while roller shell 23 being replaceable.

Further, as shown in FIGS. 4 and 5, engaging member 33 is fitted to hole part 22F formed on the outer circumferential surface of bushing 22 and engages with groove part 23E formed on second cylindrical part 232 of roller shell 23. Therefore, when roller shell 23 is about to rotate relative to bushing 22 in circumferential direction C, engaging member 33 engages with both of hole part 22F and groove part 23E. Accordingly, rotation of roller shell 23 relative to bushing 22 in circumferential direction C can be further suppressed.

Moreover, as shown in FIG. 2, roller shell 23 comes into contact with the end surface (bottom surface 23Aa) of roller shell 23 through elastic member 25. When elastic member 25 is sandwiched between roller shell 23 and retainer 24, elastic member 25 is elastically deformed. As a result, resilience due to elastic deformation of elastic member 25 is exerted to roller shell 23 and retainer 24. This resilience allows roller shell 23 and retainer 24 to be fixed more firmly.

Moreover, as shown in FIG. 6, second cylindrical part 232 of roller shell 23 is positioned so as to cover region R1 on an outer circumferential side of overhanging portion 33aa. Accordingly, engaging member 33 is prevented from getting out of hole part 22F. Moreover, since engaging member 33 can be prevented from getting out of 22F as long as second cylindrical part 232 covers only region R1 on an outer circumferential side of overhanging portion 33aa, it would not be necessary for second cylindrical part 232 to cover region R2 on an outer circumferential side of protrusion part 33b. Accordingly, thickness T of second cylindrical part 232 can be made smaller, and the shape of second cylindrical part 232 can be simplified, so that the cost for roller shell 23 can be reduced.

Moreover, as shown in FIG. 5, size W2 of groove part 23E in the circumferential direction is smaller than size W1 of hole part 22F in the circumferential direction. Accordingly, region R1 on an outer circumferential side of overhanging portion 33aa can be covered with roller shell 23 as shown in FIG. 6.

Moreover, as shown in FIG. 6, roller shell 23 is positioned so as to cover region R1 on the outer circumferential side of both first overhanging portion 33aa and second overhanging portion 33aa. Therefore, roller shell 23 can securely prevent engaging member 33 from getting out of hole part 22F.

Moreover, as shown in FIG. 7, groove part 23E is open at end surface 23F of second cylindrical part 232 in the rotation axis direction. Therefore, when roller shell 23 is fitted to bushing 22 in the rotation axis direction, protrusion part 33b of engaging member 33 fitted to hole part 22F of bushing 22 can be inserted into groove part 23E from the opening part in end surface 23F of second cylindrical part 232. Accordingly, roller shell 23 can be readily attached.

Moreover, as shown in FIGS. 2 and 3, O-ring 28 arranged between the outer circumferential surface of bushing 22 and inner circumferential surface 24A of retainer 24 can suppress entrance of water between roller shell 23 and bushing 22.

Moreover, as shown in FIGS. 2 and 3, O-ring 29 arranged between step part 23B and bushing 22 prevents entrance of earth and sand to a contact surface between roller shell 23 and bushing 22. Therefore, even after a long time use of roller device 20, roller shell 23 can be readily detached from bushing 22.

Moreover, as shown in FIGS. 2 and 3, a whole or a part of step part 23B is a tapered part. Therefore, O-ring 29 can be provided between this tapered part and bushing 22. Moreover, since roller shell 23 is held by retainer 24 from the other end surface 23A toward the one end surface 23F, step part 23B of roller shell 23 can engage with step part 22E of bushing 22 through O-ring 29.

Moreover, when elastic member 25 shown in FIG. 2 is formed over an entire circumference in the circumferential direction of bushing 22, elastic member 25 can fix roller shell 23 to retainer 24 over an entire circumference in the circumferential direction of bushing 22. Accordingly, roller shell 23 and retainer 24 can be fixed more firmly.

Moreover, when elastic member 25 shown in FIG. 2 has a plurality of elastic segments arranged individually along the circumferential direction of bushing 22, the elastic segments can be arranged individually. Therefore, elastic member 25 can be readily arranged. Accordingly, roller shell 23 and retainer 24 can be readily fixed.

Moreover, as shown in FIG. 2, length L1 of the inner circumference of roller shell 23 in the rotation axis direction is shorter than length L2 of small-diameter bushing part 22C of bushing 22 in the rotation axis direction. Accordingly, elastic member 25 is arranged on outside in the radial direction of bushing 22, so that retainer 24 fixed on end surface 22A of bushing 22 can readily come into contact with roller shell 23 through elastic member 25.

Second Embodiment

Figure 8:
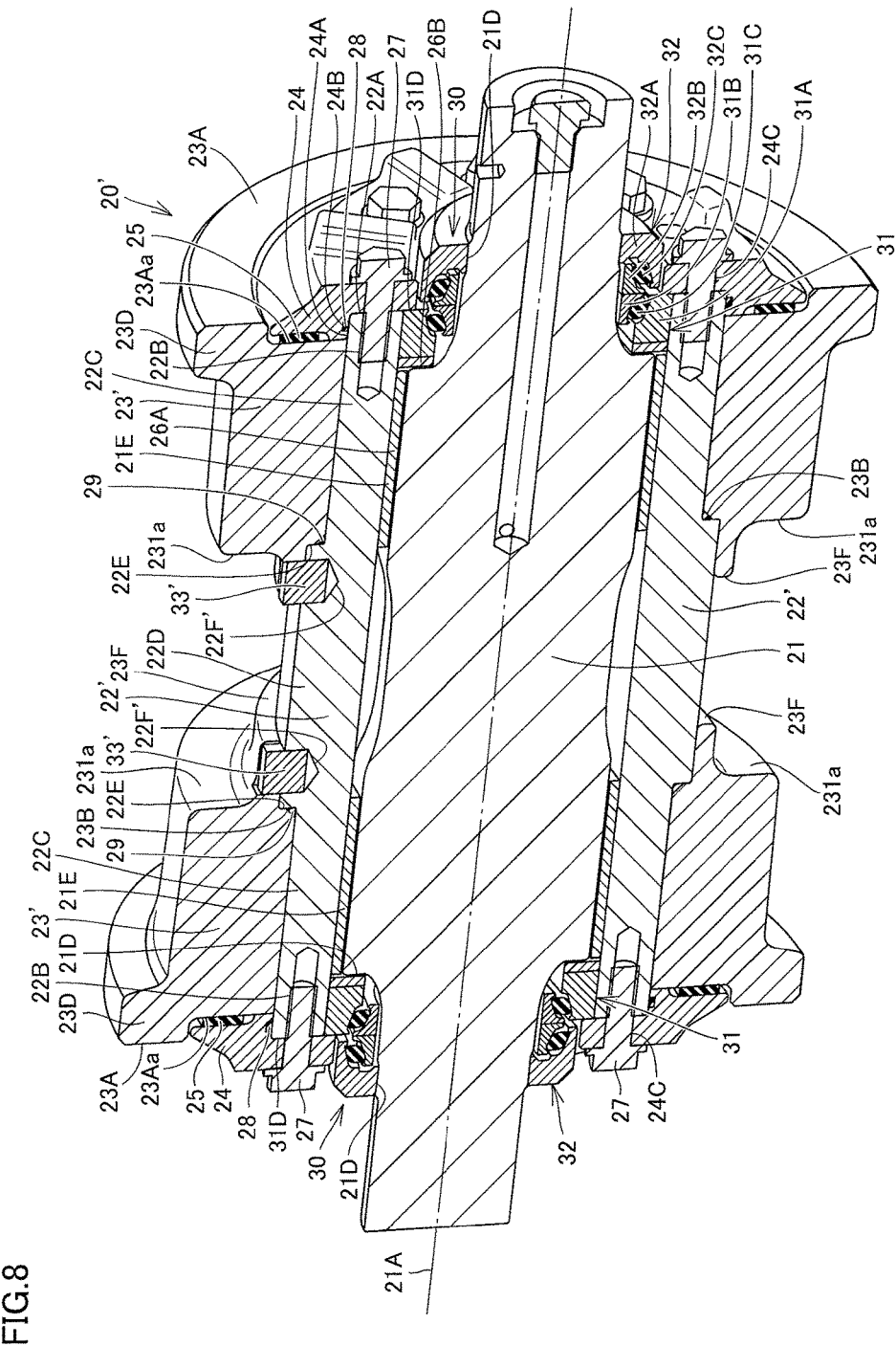
FIG. 8 is a partially exploded perspective cross-sectional view schematically representing a configuration of the roller device according to a second embodiment of the present invention.
Figure 9:
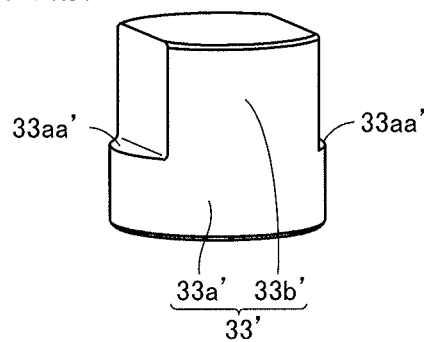
FIG. 9 is a perspective view schematically representing a configuration of a knock pin included in the roller device of FIG. 8.
Figure 10:
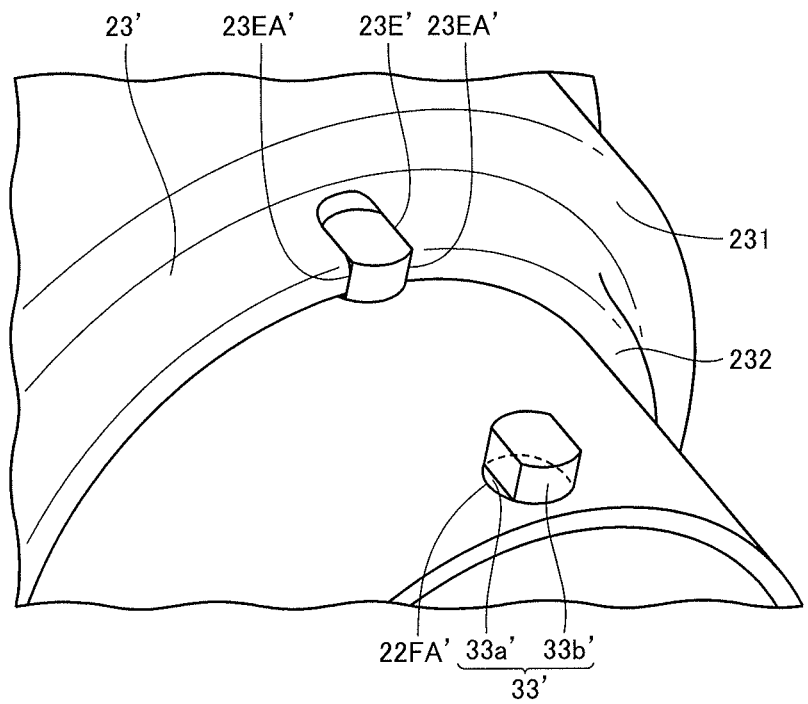
FIG. 10 is a partial perspective view representing a circumstance in which the knock pin engages with a hole part and a slit (groove part) in the roller device of FIG. 8.
Figure 11:
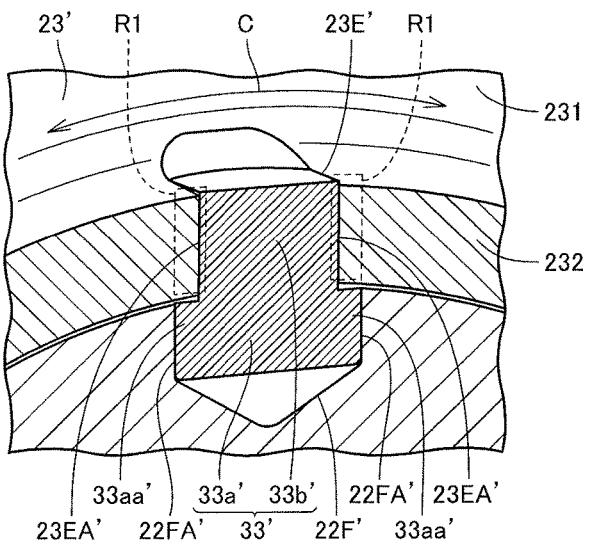
FIG. 11 is a partial perspective cross-sectional view representing the circumstance in which the knock pin engages with the hole part and the slit (groove part) in the roller device of FIG. 8.

FIG. 8 is a partially exploded perspective cross-sectional view schematically representing a configuration of a roller device according to a second embodiment of the present invention. FIG. 9 is a perspective view schematically representing a knock pin included in the roller device of FIG. 8. FIGS. 10 and 11 are a partial perspective view and a partial perspective cross-sectional view, respectively, representing the circumstance in which the knock pin engages with a hole part and a slit in the roller device of FIG. 8.

Referring mainly to FIG. 8, a configuration of roller device 20' of the present embodiment is different from the configuration of roller device 20' of the first embodiment shown in FIGS. 2 to 6 in the configuration of engaging member 33' and the shape of recess 22F' formed on the outer circumferential surface of large-diameter bushing part 22D.

Referring mainly to FIG. 9, engaging member 33' of the present embodiment is a knock pin, and has an insertion part 33a' and a protrusion part 33b'. Insertion part 33a' has a columnar shape. Protrusion part 33b' is formed to protrude from insertion part 33a' and has a so-called D-cut shape on both sides of the columnar shape in the outer circumference. Specifically, protrusion part 33b' has, when viewed from a direction in which insertion part 33a' and protrusion part 33b' overlap, two chord portions formed by cutting out parts of a circular arc part of the columnar shape, and the two chord portions are parallel with each other.

An outer diameter of the circular arc part of protrusion part 33b' is equal to an outer diameter of insertion part 33a'. Accordingly, an outer circumferential surface of the circular arc part of protrusion part 33b' constitutes a surface continuing from the outer circumferential surface of insertion part 33a'. Moreover, a size of the chord portion of protrusion part 33b' in the radial direction is smaller than an outer diameter of insertion part 33a'. Therefore, insertion part 33a' overhangs from protrusion part 33b' toward both sides on lower side of the chord portion of the protrusion part. The portions of insertion part 33a' overhanging from the chord portion of protrusion part 33b' constitute overhanging portions 33aa'.

Referring mainly to FIGS. 8 and 10, recess 22F' of the present embodiment has a circular shape when viewed from the outer circumferential side about rotation axis 21A. This recess 22F' is formed by processing with use of, for example, a drill bit. Therefore, the bottom surface of recess 22F' has a shape corresponding to a flank of a drill bit tip, for example, a conical shape.

Referring mainly to FIGS. 8 and 11, insertion part 33a' of engaging member 33' is fitted within recess 22F' formed on the outer circumferential surface of large-diameter bushing part 22D. In this state, the circumferential surface of insertion part 33a' faces the circumferential wall surface 22FA' of recess 22F' along the whole circumference.

Moreover, in the state described above, protrusion part 33b' of engaging member 33' protrudes from recess 22F' to the outer circumferential side about rotation axis 21A. Protrusion part 33b' engages with groove part 23E' provided in second cylindrical part 232 of roller shell 23'. In this state, the wall surface of each of the two chord portions of protrusion part 33b' faces with wall surface 23EA' of groove part 23E' in circumferential direction C.

Accordingly, engaging member 33' is configured to be able to engage with both bushing 22' and roller shell 23' when roller shell 23' is about to rotate relative to bushing 22' in circumferential direction C. Engaging member 33' engages with both bushing 22' and roller shell 23', so that rotation of roller shell 23' relative to bushing 22' in circumferential direction C is prevented.

Referring mainly to FIG. 8, since engaging member 33' is a knock pin as described above, roller shell 23' arranged on each of both ends of roller device 20' is prevented from rotating in the circumferential direction by means of engaging members 33' different from each other. Therefore, each of two engaging members 33' is arranged within recess 22F' formed in the outer circumferential surface of large-diameter bushing part 22D.

The configuration of the present embodiment other than those described above is substantially the same as the configuration of roller device 20 of the first embodiment shown in FIGS. 2 to 6. Therefore, the same elements have the same reference numerals allotted, and description thereof will not be repeated.

In the present embodiment, as shown in FIG. 10, engaging member 33' is a knock pin. Therefore, recess 22F' can be formed to have a circular shape when viewed from the outer circumferential side of rotation axis 21A. Accordingly, the recess can be processed by means of a drill, so that processing can be performed more readily than the case where the groove-like recess 22F is formed by milling as the case of the first embodiment.

Third Embodiment

Figure 12:
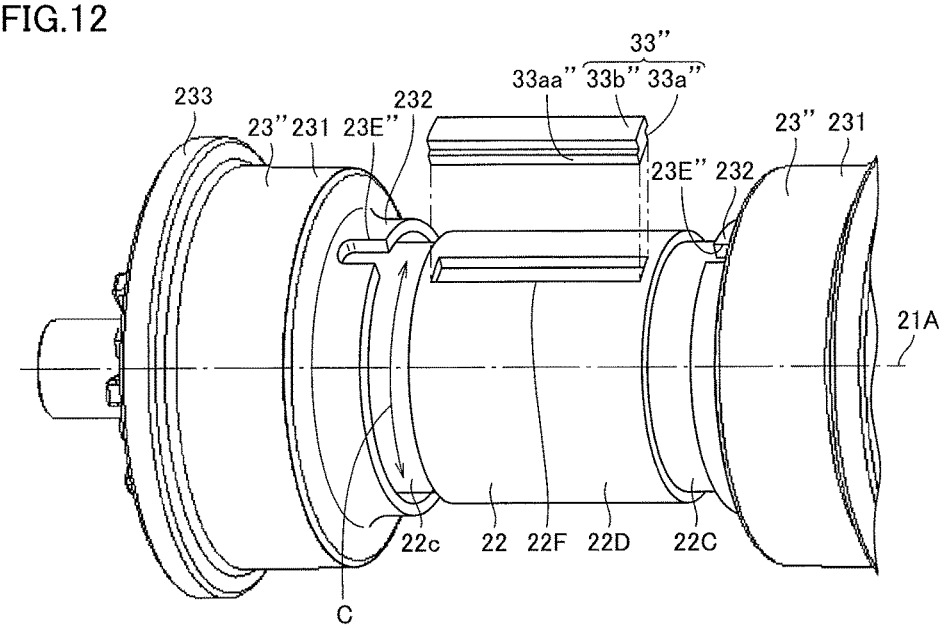
FIG. 12 is a partially exploded perspective view representing in an exploded manner a bushing, roller shells, and a key in a roller device according to a third embodiment of the present invention.
Figure 13:
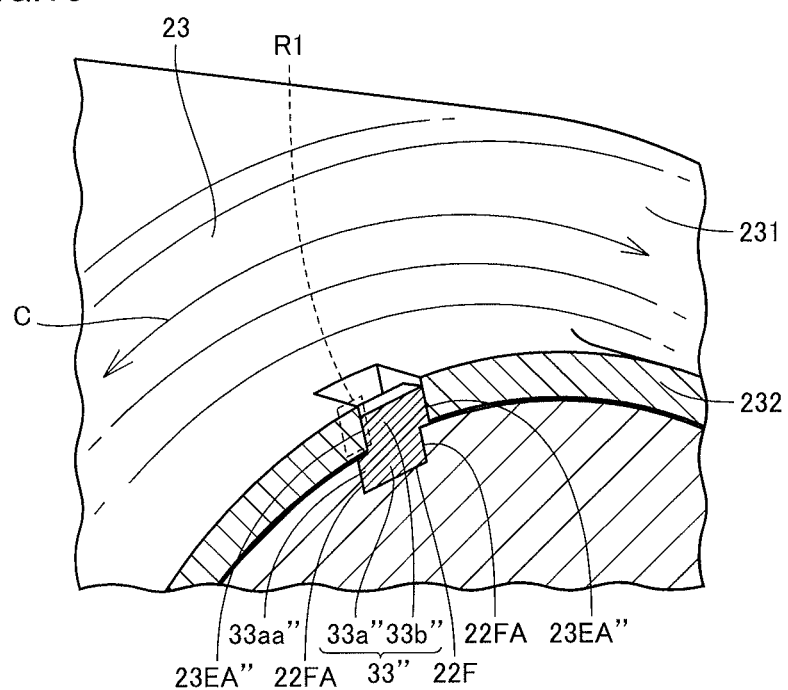
FIG. 13 is a partial perspective cross-sectional view representing a circumstance in which the key engages with a hole part and a slit (groove part) in the roller device of FIG. 12.

FIG. 12 is a partially exploded perspective view representing in an exploded manner a bushing, roller shells, and a key in a roller device according to a third embodiment of the present invention. FIG. 13 is a partial perspective cross-sectional view representing a circumstance in which the key engages with a hole part and a slit in the rolling device of FIG. 12.

Referring mainly to FIG. 12, the configuration of the roller device of the present embodiment is different in the configuration of engaging member 33" as compared to the configuration of the roller device of the first embodiment shown in FIGS. 2 to 6. Engaging member 33" is a key and has insertion part 33a" and protrusion part 33b". Each of insertion part 33a" and protrusion part 33b" extends linearly in the rotation axis direction. A size of insertion part 33a" in circumferential direction C and a size of protrusion part 33b" in circumferential direction C are substantially equal. However, the size of insertion part 33a" in circumferential direction C and the size of protrusion part 33b" in circumferential direction C may be different.

Insertion part 33a" and protrusion part 33b" are integrated in the state of being shifted in the circumferential direction from each other. Accordingly, only one end side of insertion part 33a" in circumferential direction C overhangs with respect to protrusion part 33b" toward circumferential direction C to constitute overhanging portion 33aa". The other end side of insertion part 33a" in circumferential direction C is retreated with respect to protrusion part 33b" in circumferential direction C, so that the other end side of protrusion part 33b" in circumferential direction C overhangs with respect to insertion part 33a" in circumferential direction C.

Referring mainly to FIGS. 12 and 13, insertion part 33a" of engaging member 33" fits into hole part (recess) 22F formed on the outer circumferential surface of large-diameter bushing part 22D. In this state, the wall surface crossing circumferential direction C of insertion part 33a" faces wall surface 22FA of recess 22F in circumferential direction C.

In the state described above, second cylindrical part 232 of roller shell 23" is positioned so as to cover region R1 of overhanging portion 33aa" on the outer circumferential side. Moreover, in the state described above, protrusion part 33b" of engaging member 33" protrudes from recess 22F toward the outer circumferential side about rotation axis 21A. The portion on the other end side of protrusion part 33b" in circumferential direction C protrudes from recess 22F to the other end side in circumferential direction C.

This protrusion part 33b" engages with groove part 23E" provided at second cylindrical part 232 of roller shell 23". In this state, the wall surface crossing circumferential direction C of protrusion part 33b" faces wall surface 23EA" of groove part 23E".

Accordingly, engaging member 33" is configured to be able to engage with both bushing 22 and roller shell 23" when roller shell 23" is about to rotate relative to bushing 22 in circumferential direction C. Engaging member 33" engages with both bushing 22 and roller shell 23", so that rotation of roller shell 23" relative to bushing 22 in circumferential direction C is prevented.

The configuration of the present embodiment other than those described above is substantially the same as the configuration of roller device 20 of the first embodiment shown in FIGS. 2 to 6. Therefore, the same elements have the same reference numerals allotted, and description thereof will not be repeated.

In the present embodiment, as shown in FIGS. 12 and 13, overhanging portion 33aa" overhangs only to one side relative to protrusion part 33b" in circumferential direction C. Engaging member 33" can be prevented from getting out of recess 22F of engaging member 33" also by second cylindrical part 232 covering region R1 on the outer circumferential side of overhanging portion 33aa" overhanging on one side of protrusion part 33b" in such a manner.

Fourth Embodiment

Figure 14:
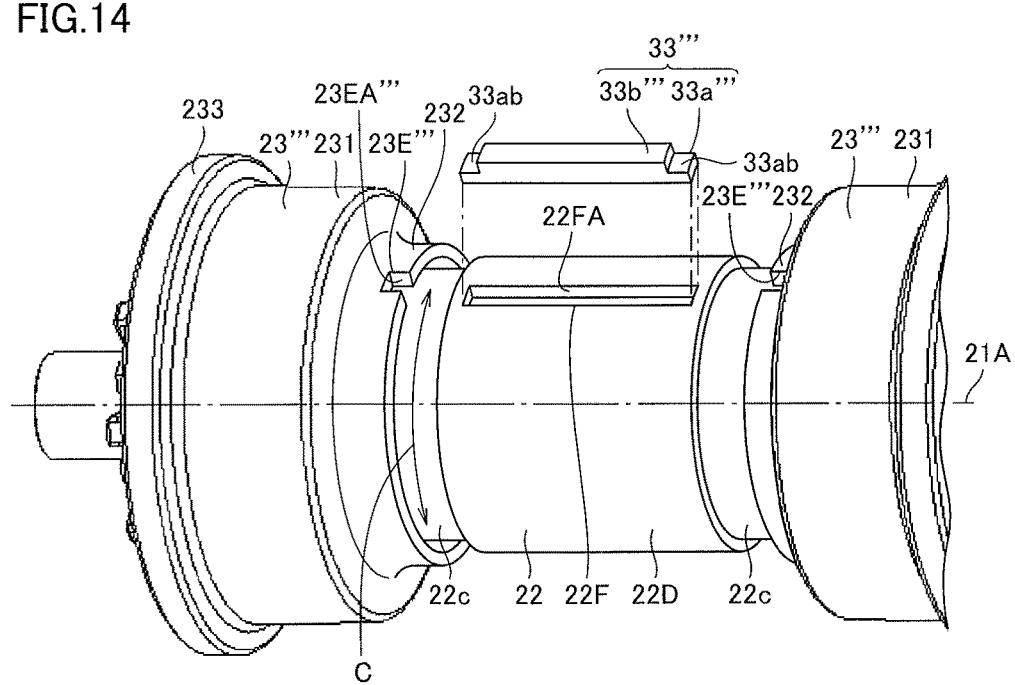
FIG. 14 is a partially exploded perspective view representing in an exploded manner the bushing, the roller shells, and the key in a roller device according to a fourth embodiment of the present invention.
Figure 15:
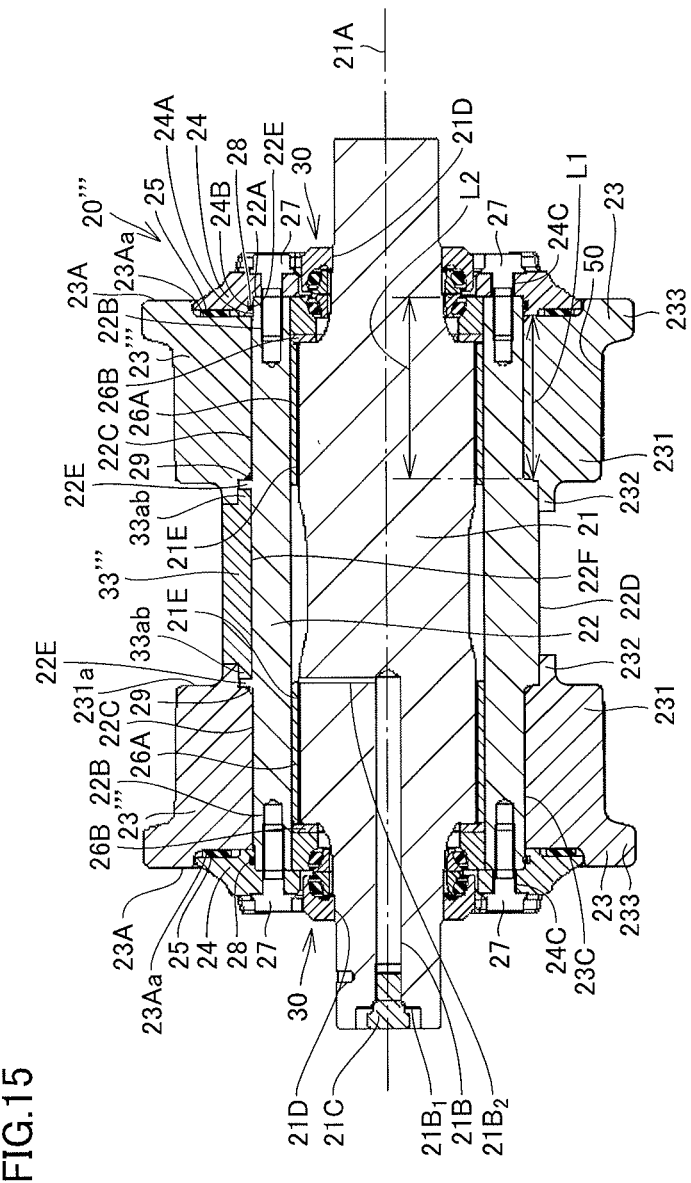
FIG. 15 is a cross-sectional view schematically representing a configuration of the roller device shown in FIG. 14.

FIG. 14 is a partially exploded perspective view representing a bushing, roller shells, and a key in an exploded manner in a roller device of a fourth embodiment of the present invention. FIG. 15 is a cross-sectional view schematically representing a configuration of the roller device shown in FIG. 14.

Referring mainly to FIG. 14, the configuration of the roller device 20''' of the present embodiment is different in engaging member 33''' as compared to the configuration of the roller device 20 of the first embodiment shown in FIGS. 2 to 6. Engaging member 33''' is a key and has insertion part 33a''' and protrusion part 33b'''. Each of insertion part 33a''' and protrusion part 33b''' extends linearly in the rotation axis direction. A size of insertion part 33a''' in the rotation axis direction and a size of protrusion part 33b''' in the rotation axis direction are different.

Specifically, the size of insertion part 33a'''' in the rotation axis direction is larger than the size of protrusion part 33b''' in the rotation axis direction. Therefore, one end of insertion part 33a''' in the rotation axis direction constitutes an overhanging portion 33ab overhanging on one end side in the rotation axis direction from one end of protrusion part 33b''' in the rotation axis direction. Moreover, the other end of insertion part 33a''' in the rotation axis direction also constitutes overhanging portion 33ab overhanging on the other end side in the rotation axis direction from the other end of protrusion part 33b''' in the rotation axis direction.

Insertion part 33a''' of engaging member 33''' fits into hole part (recess) 22F formed on the outer circumferential surface of large-diameter bushing part 22D. In this state, the wall surface of insertion part 33a''' crossing circumferential direction C faces wall surface 22FA of recess 22F in circumferential direction C.

In the state described above, protrusion part 33b''' of engaging member 33''' protrudes toward the outer circumferential side from recess 22F about rotation axis 21A. Each of both ends of protrusion part 33b''' in the rotation axis is inserted to groove part 23E''' provided in second cylindrical part 232 of roller shell 23'''.

Referring mainly to FIGS. 14 and 15, in the state described above, the wall surface of protrusion part 33b''' crossing circumferential direction C faces wall surface 23EA''' of groove part 23E''' in circumferential direction C. Accordingly, engaging member 33''' is configured so as to be engageable to both bushing 22 and roller shell 23''' when roller shell 23''' is about to rotate relative to bushing 22 in circumferential direction C. Engaging member 33''' engages with both bushing 22 and roller shell 23''', so that rotation of roller shell 23''' relative to bushing 22 in circumferential direction C is prevented.

Moreover, second cylindrical part 232 of roller shell 23''' is positioned so as to cover the region of overhanging portion 33ab on the outer circumferential side about rotation axis 21A. The region of overhanging portion 33ab on the outer circumferential side is covered with roller shell 23''', so that engaging member 33''' is prevented from getting out of hole part 22F.

The configuration of the present embodiment other than those described above is substantially the same as the configuration of roller device 20 of the first embodiment shown in FIGS. 2 to 6, so that the same elements have the same reference numerals allotted, and description thereof will not be repeated.

In the present embodiment, as shown in FIG. 14, overhanging portion 33ab overhangs relative to protrusion part 33b''' in the rotation axis direction. Second cylindrical part 232 covers the region on the outer circumferential side of overhanging portion 33ab overhanging in the rotation axis direction of protrusion part 33b''' in such a manner, so that engaging member 33''' can be prevented from getting out of recess 22F.

Moreover, since each of overhanging portion 33ab of engaging member 33''' at both ends in the rotation axis is covered at its outer circumferential part by different roller shells 23''', so that engaging member 33''' can be prevented from getting out from recess 22F more securely.

Fifth Embodiment

Figure 16:
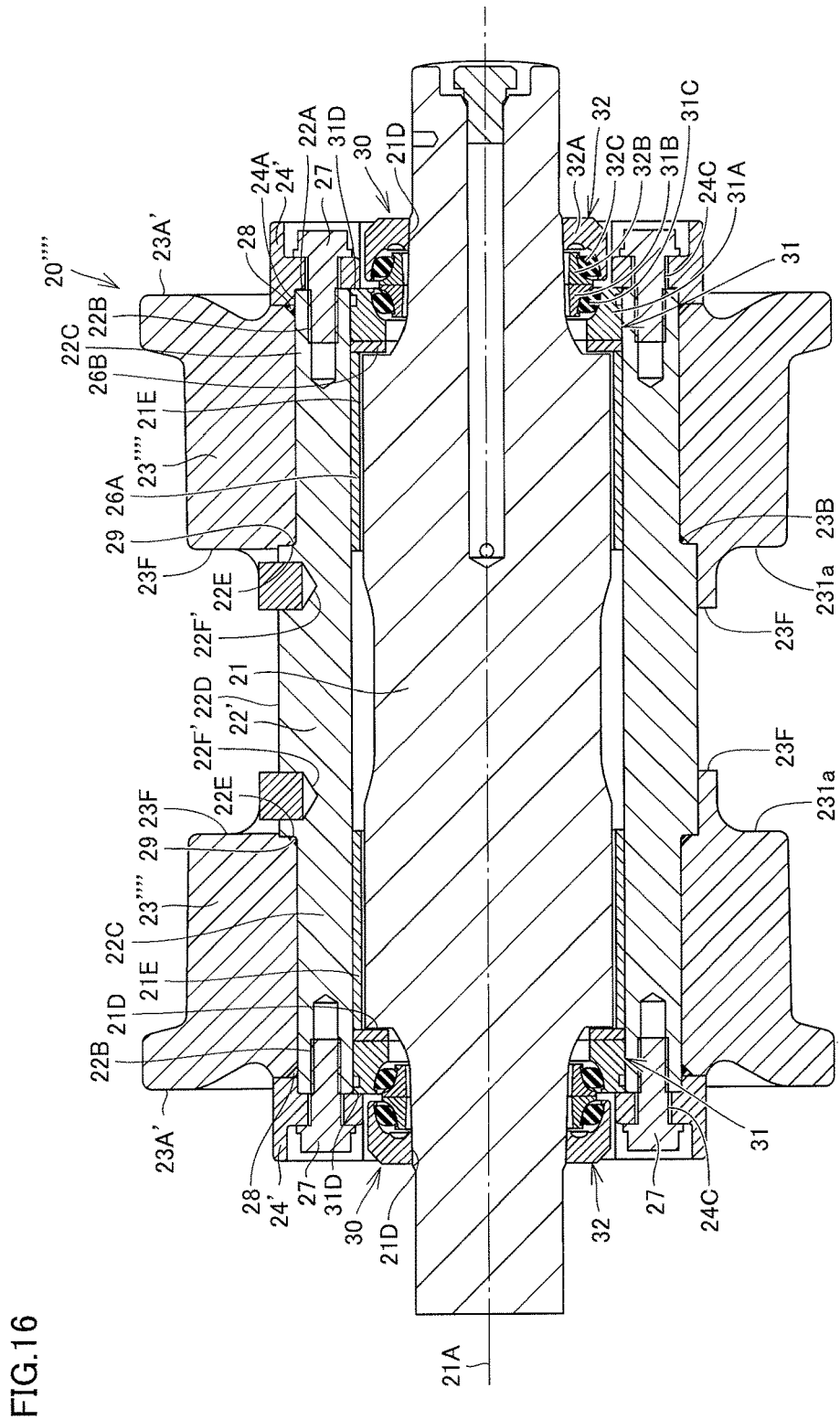
FIG. 16 is a cross-sectional view schematically representing a configuration of a roller device according to a fifth embodiment of the present invention.

FIG. 16 is a cross-sectional view schematically representing a configuration of the roller device according to a fifth embodiment of the present invention. Referring to FIG. 16, the configuration of the roller device 20'''' according to the present embodiment is different as compared to the configuration of the roller device 20' according to the second embodiment shown in FIGS. 8 to 11 in that the elastic member is not arranged between roller shell 23'''' and retainer 24'. Therefore, retainer 24' is in direct contact with end surface 23A' of roller shell 23''''.

The configuration of the present embodiment other than those described above is substantially the same as the configuration of roller device 20'''' of the second embodiment shown in FIGS. 8 to 11. Therefore, the same elements have the same reference numerals allotted, and description thereof will not be repeated.

Sixth Embodiment

Figure 17:
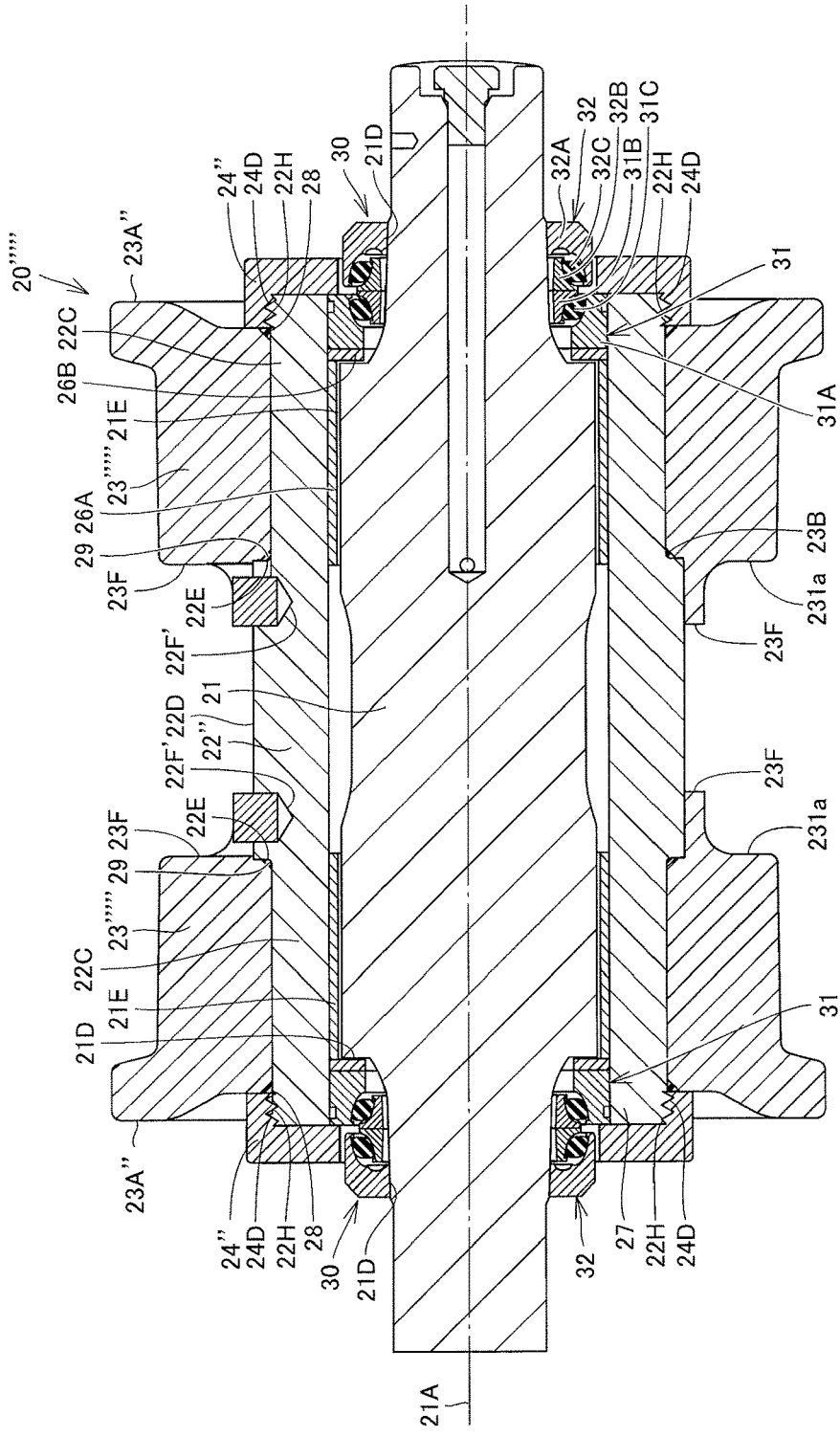
FIG. 17 is a cross-sectional view schematically representing a configuration of a roller device according to a sixth embodiment of the present invention.

FIG. 17 is a cross-sectional view schematically representing the configuration of the roller device according to a sixth embodiment of the present invention. Referring to FIG. 17, the configuration of the roller device 20''''' according to the present embodiment is different as compared to the configuration of the roller device 20'''' according to the fifth embodiment shown in FIG. 16 in that retainer 24" is screwed onto bushing 22".

Retainer 24" has an annular shape with an L-shaped cross section, and has a female thread part 24D on an annular inner circumferential surface on a side with a larger diameter. Bushing 22" has a male thread part 22H on the outer circumferential surface. Female thread part 24D formed on the inner circumferential surface of retainer 24" is screwed onto a male thread part 22H formed on the outer circumferential surface of bushing 22", so that retainer 24" is attached to bushing 22". In the state where retainer 24" is attached to bushing 22", retainer 24" holds the end surface 23A" of roller shell 23''''' and first housing 31A. Therefore, a fixing member such as a bolt for attaching retainer 24" to bushing 22" would not be necessary.

The configuration of the present embodiment other than those described above is substantially the same as the configuration of roller device 20'''' of the fifth embodiment shown in FIGS. 8 to 11. Therefore, the same elements have the same reference numerals allotted, and description thereof will not be repeated.

In the present embodiment, female thread part 24D formed on the inner circumferential surface of retainer 24" is attached to male thread part 22H formed on the outer circumferential surface of bushing 22", so that retainer 24" is attached to bushing 22". Accordingly, retainer 24" can be attached to bushing 22" without a fixing member such as a bolt. Therefore, the number of parts can be reduced.

Overhanging portions 33aa (or 33aa', 33aa"), 33ab of engaging member 33 (or 33', 33") may overhang from protrusion part 33b (or 33b', 33b") in the circumferential direction C about rotation axis 21A as can be seen in the first to third, fifth, and sixth embodiments, or overhang from protrusion part 33b''' in the rotation axis direction as can be seen in the fourth embodiment, or may overhang in both circumferential direction C and rotation axis direction.

Moreover, although the fifth embodiment has a configuration in which elastic member 25 is omitted from the configuration of the second embodiment, elastic member 25 may be omitted from the first to fourth embodiments. Moreover, the sixth embodiment describes the configuration in which the elastic member is not provided between roller shell 23''''' and retainer 24". However, the elastic member may be arranged between roller shell 23''''' and retainer 24".

The disclosed embodiments are by way of illustration in all aspects and are not to be taken by way of limitation. The scope of the present invention is presented in the scope of patent, and is intended to include all the modification within the meaning and scope equivalent to those in the claims.

REFERENCE SIGNS LIST 1 track-type traveling unit; 2 vehicular body; 3 blade; 3a upper end; 4 cab; 5 engine compartment; 6 frame; 7 angle cylinder; 8 lift cylinder; 10 crawler belt apparatus; 11, 11A, 11B crawler belt link; 12, 22 bushing; 13 coupling pin; 14 track shoe plate; 15 sealing member; 16 bushing hole; 17 pin hole; 20, 20', 20''', 20'''', 20''''' roller device; 20a carrier roller; 21 shaft; 21A rotation axis; 21B supply passage; $21B_1$ opening part; $21B_2$ axial direction extending part; $21B_3$ radial direction extending part; 23C through hole; 21C plug member; 21D small-diameter shaft part; 21E large-diameter shaft part; 22C small-diameter bushing part; 22D large-diameter bushing part; 22, 22', 22" bushing; 22A, 23A, 23F, 31D, 231a end surface; 22B attachment hole; 22E, 23B step part; 22F, 22F' recess; 22FA, 22FA', 23EA, 23EA', 23EA", 23EA''' wall surface; 22H male thread part; 23, 23', 23", 23''', 23'''', 23''''' roller shell; 23A, 23A', 23A" other end surface; 23Aa bottom surface; 23Ab outer circumferential wall surface; 233 flange part; 23E, 23E', 23E", 23E''', 23E'''' groove part (slit); 24, 24', 24" retainer; 24A inner circumferential surface; 24C insertion hole; 24D female thread part; 25 elastic member; 26A bearing; 27 fixing member; 28, 29 O-ring; 30 seal; 31 first sealing member; 31A first housing; 31B first floating seal; 31C first elastic ring; 32 second sealing member; 32A second housing; 32B second floating seal; 32C second elastic ring; 33, 33', 33", 33''' engaging member; 33a, 33a', 33a", 33a''' insertion part; 33aa, 33aa", 33ab overhanging portion; 33b, 33b', 33b", 33b''' protrusion part; 41 drive wheel; 42 idler wheel; 43 track frame; 50 rail surface; 100 bulldozer; 231 first cylindrical part; 232 second cylindrical part.

The invention claimed is:

1. A roller device for a track-type work vehicle, comprising:
  a shaft including a rotation axis;
  a bushing including a small-diameter part arranged at an end, and a large-diameter part arranged to have a step part with the small-diameter part, the large-diameter part having an outer circumferential surface with a recess, the bushing being fitted to an outer circumference of the shaft so as to be rotatable about the rotation axis relative to the shaft;

a roller shell including a first cylindrical part having a first outer circumferential surface and a first inner circumferential surface, and a second cylindrical part having a second outer circumferential surface and a second inner circumferential surface, an outer diameter of the first cylindrical part being larger than an outer diameter of the second cylindrical part, an inner diameter of the first cylindrical part being smaller than an inner diameter of the second cylindrical part, the first cylindrical part being fitted at the first inner circumferential surface to the small-diameter part of the bushing, the second cylindrical part being fitted at the second inner circumferential surface to the large-diameter part of the bushing, the second cylindrical part having at the second inner circumferential surface a groove part which is open at an end surface of the second cylindrical part in an extending direction of the rotation axis, the roller shell engaging with the step part;

an engaging member fitted to the recess and engaging with the groove part; and a retainer formed to be annular and detachably attached to the bushing to hold an end surface of the roller shell.

2. The roller device for a track-type work vehicle according to claim 1, wherein the engaging member includes an insertion part inserted into the recess, and a protrusion part protruding from the recess toward an outer circumferential side about the rotation axis, and the insertion part has an overhanging part which overhangs from the protrusion part in at least any of the extending direction of the rotation axis and the circumferential direction about the rotation axis, and the roller shell is positioned so as to cover the overhanging part.

3. The roller device for a track-type work vehicle according to claim 2, wherein a size of the groove part in the circumferential direction is smaller than a size of the recess in the circumferential direction.

4. The roller device for a track-type work vehicle according to claim 2, wherein the overhanging part has a first overhanging portion overhanging on one side in the circumferential direction with respect to the protrusion part, and a second overhanging portion overhanging on the other side in the circumferential direction with respect to the protrusion part, and the roller shell is positioned so as to cover outer circumferential sides of both of the first overhanging portion and the second overhanging portion.

5. The roller device for a track-type work vehicle according to claim 2, wherein the overhanging part overhangs only on one side in the circumferential direction with respect to the protrusion part.

6. The roller device for a track-type work vehicle according to claim 1, wherein a male thread is formed on the outer circumferential surface of the bushing, and a female thread part screwed to the male thread part is formed on an inner circumferential surface of the retainer, and the retainer is attached to the bushing by screwing the female thread part to the male thread part.

7. The roller device for a track-type work vehicle according to claim 1, wherein the recess has a circular shape in a view from the outer circumferential side about the rotation axis, and the engaging member is a knock pin.

8. The roller device for a track-type work vehicle according to claim 1, wherein the groove part of the second cylindrical part is a slit which extends through the second outer circumferential surface and the second inner circumferential surface.

9. A roller shell for a track-type work vehicle, the roller shell being attached to a shaft having a rotation axis through a bushing and fixed to the bushing by means of a retainer that prevents relative rotation between the roller shell and the bushing, the roller shell including a first cylindrical part and a second cylindrical part, the first cylindrical part and the second cylindrical part being connected to each other as a unitary member, the first cylindrical part having a first outer circumferential surface, a first inner circumferential surface, a first axial end surface, and an annular flange part, the first axial end surface having a first end surface which is an axial end surface of the annular flange part and a second end surface which is located radially inward with respect to the first end surface, the annular flange part radially projecting from the first outer circumferential surface at a side of the first axial end surface, and the first end surface being located axially outward with respect to the second end surface, the second end surface having a portion for contacting the retainer, the second cylindrical part having a second outer circumferential surface, a second inner circumferential surface, and a second axial end surface which faces opposite to the first axial end surface and extends radially outward of an outer circumferential surface of the bushing, an outer diameter of the first cylindrical part being larger than an outer diameter of the second cylindrical part, an inner diameter of the first cylindrical part being smaller than an inner diameter of the second cylindrical part, the second cylindrical part having on the second inner circumferential surface a groove part which is open at the second axial end surface of the second cylindrical part.

10. The roller shell according to claim 9, wherein the groove part of the second cylindrical part is a singular slit which extends through the second outer circumferential surface and the second inner circumferential surface in a radial direction, and extends from the second axial end surface to a vicinity of the first cylindrical part.

11. The roller shell according to claim 9, wherein the second inner circumferential surface of the second cylindrical part has a circular cylindrical shape.

* * * * *